(12) United States Patent
Humphries

(10) Patent No.: US 9,609,269 B2
(45) Date of Patent: Mar. 28, 2017

(54) REMOTE WEB-BASED VISITATION SYSTEM FOR PRISONS

(71) Applicant: HomeWAV, LLC, St. Louis, MO (US)

(72) Inventor: Gary James Humphries, Virginia Beach, VA (US)

(73) Assignee: HomeWAV, LLC, St. Louis, MO (US)

( * ) Notice: Subject to any disclaimer, the term of this patent is extended or adjusted under 35 U.S.C. 154(b) by 0 days.

(21) Appl. No.: 14/793,350

(22) Filed: Jul. 7, 2015

(65) Prior Publication Data

US 2016/0191849 A1     Jun. 30, 2016

(51) Int. Cl.
    H04N 7/14      (2006.01)
    G06Q 20/14     (2012.01)

(52) U.S. Cl.
    CPC ............ *H04N 7/147* (2013.01); *G06Q 20/14* (2013.01); *H04N 7/14* (2013.01); *H04N 7/141* (2013.01)

(58) Field of Classification Search
    CPC ..................................................... H04N 7/14
    USPC .................... 348/14.01, 14.07, 14.03, 14.12
    See application file for complete search history.

(56) References Cited

U.S. PATENT DOCUMENTS

| | | | |
|---|---|---|---|
| 4,054,756 A | 10/1977 | Comella et al. | |
| 5,382,972 A | 1/1995 | Kannes | |
| 6,052,454 A * | 4/2000 | Kek | H04M 1/6505 379/188 |
| 6,844,893 B1 | 1/2005 | Miller et al. | |
| 7,046,779 B2 | 5/2006 | Hesse | |
| 7,061,521 B2 | 6/2006 | Bulriss et al. | |
| 7,158,621 B2 | 1/2007 | Bayne | |
| 7,256,816 B2 | 8/2007 | Profanchik et al. | |
| 8,064,580 B1 | 11/2011 | Apple et al. | |
| 8,099,080 B1 | 1/2012 | Rae et al. | |
| 8,160,219 B2 | 4/2012 | Bayne | |
| 8,648,894 B2 | 2/2014 | Laney et al. | |
| 2004/0252184 A1 * | 12/2004 | Hesse | E04H 1/14 348/14.01 |
| 2005/0128283 A1 | 6/2005 | Bulriss et al. | |
| 2007/0285504 A1 | 12/2007 | Hesse | |
| 2008/0000966 A1 | 1/2008 | Keiser | |
| 2008/0201158 A1 | 8/2008 | Johnson et al. | |
| 2009/0228383 A1 | 9/2009 | Martinez et al. | |
| 2011/0096139 A1 * | 4/2011 | Rudolf | H04N 7/142 348/14.11 |
| 2011/0110507 A1 | 5/2011 | Spiegel | |

(Continued)

*Primary Examiner* — Olisa Anwah
(74) *Attorney, Agent, or Firm* — Polster Lieder

(57) ABSTRACT

A web-based video conferencing system and method for providing remote visitation with inmates incarnated in a prison. All visitations are initiated by the inmates and no endpoint control by prison personnel is required. "Jail-hardened" terminals in the prison communicate via Internet with visitor Internet-enabled devices. Payment for services is paid by visitors using an on-line payment service relieving prison personnel of any handling of money. All calls (excluding clergy, lawyers, etc.) are typically recorded and no routine monitoring is required by prison personnel. Inmates use the "jail-hardened" terminals to initiate video conference using only a 12-key telephone style keypad. A fee-per-minute is charged. Time is tracked for each call and the call duration and remaining time for a call based upon the maximum allowed call length and an inmate's available minutes are displayed for both the visitor and the inmate.

21 Claims, 27 Drawing Sheets

(56) References Cited

U.S. PATENT DOCUMENTS

2012/0262271 A1 10/2012 Torgersrud et al.
2012/0281058 A1* 11/2012 Laney .................... H04N 7/147
                                                    348/14.03
2013/0058469 A1 3/2013 Gongaware et al.

* cited by examiner

REMOTE WEB-BASED VISITATION SYSTEM FOR PRISONS

CROSS-REFERENCE TO RELATED APPLICATIONS

This application is a continuation of U.S. patent application Ser. No. 13/363,498 filed on Feb. 1, 2012.

FIELD OF THE INVENTION

The invention pertains to video conferencing and, more particularly, to a web-based visitation system for use in communicating with incarcerated persons from a remote site.

BACKGROUND OF THE INVENTION

When two parties want to communicate over great distances in real-time, the telephone has heretofore been the communication technology of choice. However, advancements in communication technologies over the past several years now allow both audio and video communication between parties over great distances, typically via the Internet. These forms of communication are commonly referred to as video conferencing. Modern video conferencing, depending on the complexity (and associated expense) of the equipment involved can provide virtually real-time communication among two or more parties.

Video conferencing typically requires local equipment associated with each person seeking to participate in the conference. When the conference is to be started, the equipment at each location is used to call in (e.g., "conference in") to a call center or the like. As each of these endpoints establishes a connection with the central location, the video and audio signals may then be accessed by all of the participants so that a conversation with both audio and video can take place. One common type of video conferencing equipment uses especially dedicated equipment at each geographic location for the participants. Such equipment typically uses an Integrated Services Digital Network (ISDN) or similar data connection to transmit and receive audio/video communication data during the video conference.

Unfortunately, conventionally available video conferencing equipment of the prior art has a common characteristic: each system requires endpoint initiation and/or termination (i.e., end point control) for each participant in the conference. Such end point control is particularly problematic when the video conferencing system is used as a remote visitation system where one participant is incarcerated (i.e., a prisoner in a jail, prison, penitentiary, etc.).

As used hereinafter, the term inmate will be applied to such incarcerated persons and the term prison will be used to refer to any and all facilities where an inmate may be incarcerated.

To allow an inmate to have end point control of a remote visitation system is universally disallowed. Prisons do not want inmates to have unrestricted access to the Internet. Consequently, in such systems of the prior art, prison personnel are required to handle video conference initiation and termination as well as to monitor most, if not all, non-privileged video conferences.

However, the advantages of a remote visitation video conferencing system in the prison environment are many. Often, an inmate is incarcerated in a location a great distance from his family or friends. Such distances often result in visitation of the inmate being inconvenient or even impossible due to travel time and expense for friends and family. Consequently, a video conference with the inmate would seem to provide an acceptable alternative to an in-person visit. However, the expense and complexity of traditional video visitation equipment, and associated personnel cost incurred by the prison to facilitate end point control may be prohibitive. Perhaps more important is the potential security risk if an inmate has endpoint control. In conventional face-to-face visits, conversations between inmates and their visitors are monitored to ensure that no greater security risk is created than already exists with an outsider's presence in the prison. However, if endpoint control, in Internet based video visitation, were given to an inmate, it would be difficult to effectively monitor the visit to ensure security. Potential security breaches include, but are not limited to, coded dialog between the inmate and a visitor, as well as hand and facial gestures used to communicate prohibited information.

While traditional video conferencing equipment could potentially be used in the prison environment, the above-mentioned problems would still be present. To illustrate the point; a video communication initiated outside of the prison, over the Internet, directed to an inmate, using a traditional video visitation system, must be received by one or more designated prison employees. The prison employee then has to contact prison employees working in the inmate's cell block, and determine whether the inmate is available to receive the visit. If the inmate is available to receive a visit then the prison employees, working in the inmate's cell block, are then required to coordinate ushering the inmate to the designated video visitation station to receive the visit, and the visit is connected. Outgoing Internet based video visitation using traditional systems also puts demands on prison personnel in that the system requires prison personnel to initiate the communication and coordinate placement of the inmate at a station within his cell block to receive the communication. Thus, a traditional video visitation system, using the Internet to facilitate the communication, whether the communication is incoming or outgoing, places a heavy labor burden on the prison. An Internet based traditional video visitation cannot be initiated directly by an inmate, without prison personnel intervention, because prisons will not allow unrestricted inmate access to the Internet.

One further reason traditional video conferencing would not be workable for prison visitation and other similar situations is the lack of synchronicity between data connections during the conference. More specifically, as each participant in the video conference connects to the conversation, a new data connection, or path, is created. In a prison situation, at least three data paths would be present: one for the inmate, one for the visitor, and one for the overseer monitoring the conversation. Unfortunately, an inherent latency exists between these multiple connections that pose a significant security risk for the prison. Because of latency in the data path during data transmission, communication is not instantaneous; the delay is a function of all intermediate equipment and media along the data path. Because different routes may be taken along each data path, there may exist a difference in latency and the delay experienced by each when each party is connected with a separate data path. Unfortunately, this difference in latency among multiple simultaneous data paths poses a significant security risk for a prison. As a result, the visitor or inmate may engage in an improper communication during the visit, but the difference in latency between connections prevents the overseer from learning of the improper conduct in time to prevent it or further improper conduct from occurring.

Accordingly, what is needed is an Internet based video visitation system that; (i) permits video visits between participants that are initiated by inmates, under strictly controlled parameters, and (ii) does not require the assistance of prison personnel to effectuate the communication.

DISCUSSION OF THE RELATED ART

Several attempts to solve some of the problems, that are solved by the present invention, may be found in the prior art. For example, U.S. Pat. No. 5,382,972 for VIDEO CONFERENCING SYSTEM FOR COURTROOM AND OTHER APPLICATIONS, issued Jan. 17, 1995 to Deno Kannes teaches a conferencing system for interactive video (and preferably also audio) communication, which includes a composite video signal generation means. The system preferably also includes a recording unit for producing a permanent, combined video and audio record of a conference. The system includes a monitor for each conferee, which displays a composite video signal including a principal video image in a large picture region of the monitor screen and secondary video images in small picture regions of the monitor screen.

U.S. Pat. No. 6,844,893 for RESTAURANT VIDEO CONFERENCING SYSTEM AND METHOD, issued Jan. 18, 2005 to William G. Miller et al. provides a system and method that combines restaurant services with video-conferencing and multimedia access for diverse customer appeal. The MILLER et al. system and method employ a number of booths in a number of restaurants whereby each booth can video-conference with each other booth, particularly in different time zones, while also providing multimedia access such as satellite TV, cable, broadcast TV, computer programs and gaming, internet access. Each booth is linked to a local area network and is equipped with a display screen and video and audio controls. The local area network of each restaurant is linked to the local area network of each other restaurant forming a corporate intranet that allows media uses and various management capabilities such s scheduling, accounting, security, training and the like.

U.S. Pat. No. 7,046,779 for VIDEO CONFERENCE SYSTEM AND METHODS FOR USE AT MULTI-STATION SITES, issued May 16, 2006 to Thomas H. Hesse provides a video conference system that includes at each of several sites multiple participant stations and a control station. A conference coordinator (e.g., a guard or receptionist) operating the control station receives notice from the control station that a scheduled conference is about to begin and directs a person identified to be a participant of the conference to a station designated by the notice. Signals from participant stations are monitored and if a participant station is determined to be unavailable, the conference may be rescheduled to replace the available station with an alternate available station. Notice sufficient to direct a participant to the alternate station is provided via the control station to the coordinator. The subject of detecting availability and rescheduling alternatives may be an item of equipment or an equipment capability (e.g., a recorder channel to be used for recording the conference). Higher ranking requests may force rescheduling of already scheduled lower ranking conferences.

U.S. Pat. No. 7,061,521 for VIDEO CONFERENCE SYSTEM PROVIDING PRIVATE AND ATTORNEY-CLIENT PRIVILEGED COMMUNICATIONS, issued Jun. 13, 2006 to Michael E. B ulriss et al. teaches a conference system includes a first conference station generating at least one of audio and video signals from at least an attorney and a second conference station generating at least one of audio and video signals from the attorney's client, the attorney and the attorney's client having a relationship protected by the attorney-client privilege. The system also includes at least one communications link connecting the first and second conference stations that carries the audio and/or video signals between the first and second conference stations. A signal processor is disposed within the communications link between the first and second conference stations to route signals between the first and second conference stations. At least one control panel communicates with the signal processor and provides control over audio and/or video signals so that the attorney and the attorney's client are permitted to engage in a private communication without vitiating the attorney-client privilege.

U.S. Pat. No. 7,256,816 for SYSTEMS AND PROCESSES FOR SCHEDULING AND CONDUCTING AUDIO/VIDEO COMMUNICATIONS, issued Aug. 14, 2007 to John D. Profanchik et al. discloses methods of scheduling and conducting video visits, as well as computer architecture for providing such scheduling and conducting, where the participants in the visit are not required or able to interact with the audio/video equipment for the initial connection to start the video visit. In some embodiments, participants are also not able to interact with the equipment during the actual visit, and thus the equipment employed during the video visit may be isolated from physical contact by the participants. To initiate or terminate a video visit, a data center establishes a data connection with each participant, and thus the flow of data between the participants moves across a computer network via the data center. The visit may be monitored in virtually real-time by splitting the data transmitted between the participants and sending it to a monitoring terminal, rather than establishing a separate connection for the monitoring.

U.S. published patent application No. 2009/0228383 for SYSTEM AND METHOD FOR PROACTIVELY ESTABLISHING A THIRD-PARTY PAYMENT ACCOUNT FOR SERVICES RENDERED TO A RESIDENT OF A CONTROLLED-ENVIRONMENT FACILITY, published Sep. 10, 2009 upon application by Veronica Martinez et al. provides systems and methods for proactively establishing a third party payment account for services rendered to a resident of a controlled-environment facility ("CEF"). A campaign-triggering event is detected, which triggers contact of prospective third-party ("3rd party") payers for a resident of a CEF in order to encourage such prospective 3rd party payers to establish 3rd-party payment accounts for the resident. In this manner, the prospective 3rd party payers are proactively contacted prior to an expected future demand for service by the resident. A method thus comprises identifying at least one prospective third-party payer for a resident of a controlled-environment facility, and proactively contacting the identified at least one prospective third-party payer prior to demand for service by the resident to encourage the identified at least one prospective third-party payer to establish a third-party payment account for payment for future service expected for the resident None of the patents and the published patent application, taken singly, or in any combination, are seen to teach or suggest the novel Remote Web-Based Visitation System for Prisons of the present invention.

SUMMARY

The present invention provides a video conferencing system and method adapted for use in providing remote visitation of inmates incarnated in a prison. The need for prison personnel to provide endpoint control to initiate or terminate a visit is eliminated in the novel visitation system of the invention. Further, all visitations are initiated by the inmates during defined visitation times established by the prison.

Also importantly, while this is a fee for services system, with a programmable per minute charge, no monies pass through the prison, but rather are paid directly to the owner/operator of the remote visitation system.

One or more "jail-hardened" terminals are located, typically in common areas, in the prison. These terminals and all support equipment are typically provided and maintained by the system owner/operator. Inmates use these "jail-hardened" inmate visitation terminals to initiate a video conference using only a 12-key telephone style keypad to select and connect to visitors who have previously registered as an allowable visitor for the inmate.

Unless a visitor has been designated a clergy member or a legal representative with whom the inmate is entitled to privileged communication, all visits are recorded. Visits with privileged visitors are not typically recorded.

Visitors need an Internet-connected appliance which may be a desktop or notebook computer, an Internet connected tablet or a smart phone or any other suitable device capable of supporting video conferencing across the Internet.

Visitors using PayPal® or a similar on-line payment system prepay for visitation minutes with an individual inmate. A per-minute charge may be set for each call made. There is typically no minimum call length.

Time is tracked for each call and the call duration and the minutes remaining for a call based upon the maximum allowed call length and an inmate's available minutes are displayed for both the visitor and the inmate.

During a visit, video images of both the inmate and the visitor are displayed at both the inmate terminal and the visitor terminal.

It is, therefore, an object of the invention to provide a web-based audio/video visitation system for prisons that allows video conferencing between an inmate, in a prison, and a visitor across the Internet.

It is another object of the invention to provide a web-based audio/video visitation system for prisons wherein a "jail-hardened" terminal is provided as an inmate visitation terminal within a prison.

It is an additional object of the invention to provide a web-based audio/video visitation system for prisons wherein an inmate visitation terminal includes a telephone-style numerical keypad (or another digitized user-specific input device such as,but not limited to; a card reader, a biometric reader, or other personalized device, the purpose of which is to allow inmate initiation of an Internet based video visit, without requiring prison personnel assistance), and a corrections grade telephone handset with an armored cord.

It is a further object of the invention to provide a web-based audio/video visitation system for prisons wherein a visitor station is an Internet-connected computer or other Internet appliance.

It is a still further object of the invention to provide a web-based audio/video visitation system for prisons wherein no endpoint control is required by prison personnel.

It is yet another object of the invention to provide a web-based audio/video visitation system for prisons wherein no monies flow through or are processed by the prison.

It is another object of the invention to provide a web-based audio/video visitation system for prisons wherein a prison administrator may block calls from either selected individual inmates or all inmates in the prison, as well as block calls from designated visitors, or all visitors.

It is an additional object of the invention to provide a web-based audio/video visitation system for prisons wherein a percentage of the per-minute charge for visits may be paid to the prison.

It is an additional object of the invention to provide a web-based audio/video visitation system for prisons at no cost to the prisons.

It is an additional object of the invention to provide a web-based audio/video visitation system for prisons displaying real-time visual images of the inmate and visitor on the visitor station video screen and on the inmate station video screen.

It is another object of the invention to provide a web-based audio/video visitation system for prisons that allow real-time monitoring and recording by prison personnel.

BRIEF DESCRIPTION OF THE DRAWINGS

Various objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION

The present invention provides a system for providing audio/video conference visitation between an inmate incarcerated in a prison and a visitor having an Internet connected computer or other Internet appliance.

Figure 1A:
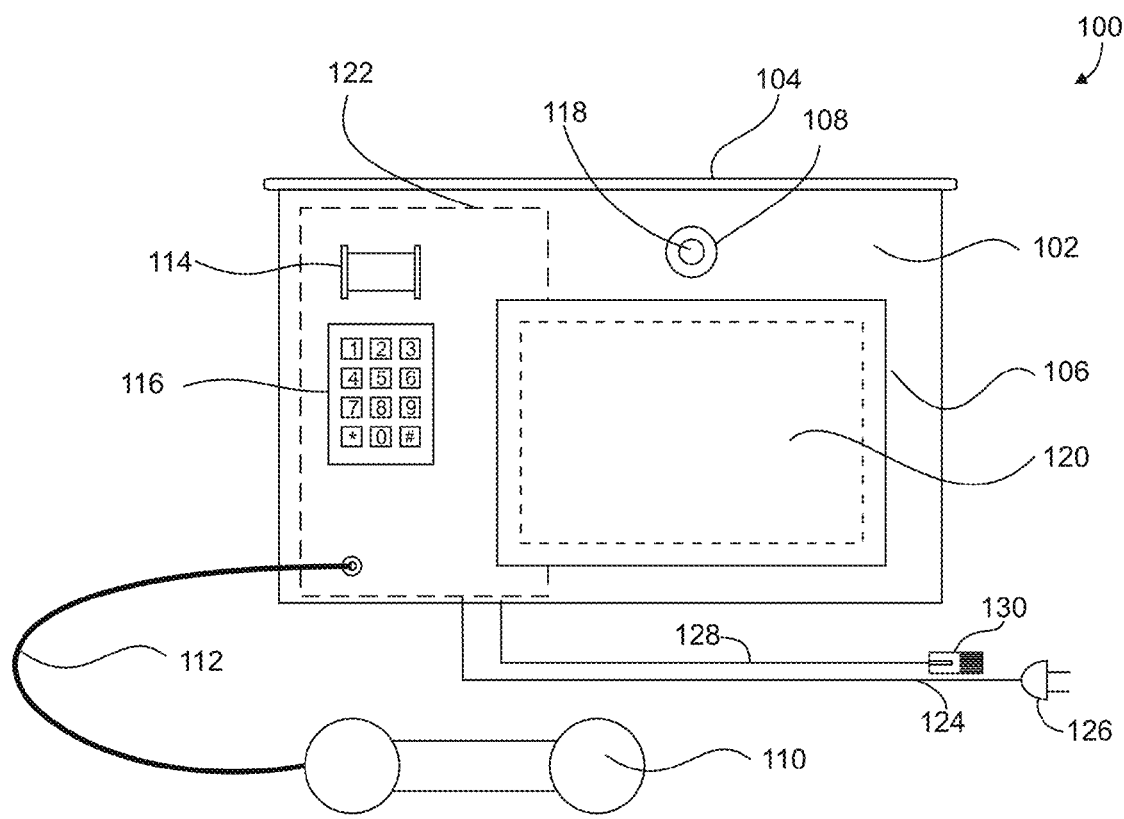
FIG. 1a is a front, elevational, schematic view of a "jail-hardened" communication station for use by an inmate using the system of the invention.

Referring first to FIG. 1a, there is shown a front, elevational, schematic view of a "jail-hardened" communication station for use by an inmate using the system of the invention, generally at reference number 100.

A "jail-hardened" steel cabinet 102 has a top or lid 104 securely affixed thereto. Cabinet 102 is typically formed from 14 gauge hardened cold rolled steel and is formed using a uni-body design to prevent any seams being accessible. Cabinet 102 is designed for ease of installation and maintenance while providing the necessary security required for equipment installed in a prison. Cabinet 102 is typically mounted to a vertical wall, not shown, and is provided with five holes, not shown, in the back wall, not shown, of cabinet 102. Four of the holes may be keyed holes allowing cabinet 102 to be hung on preinstalled screws or other similar fasteners, not shown. However, a fifth hole is a non-keyed hole to prevent cabinet 102 from being slid upward and removed from the wall. Once cabinet 102 is hung on the wall by four screws or the like through the four keyed holes, the screws may be tightened and finally, a screw is placed through the non-keyed hole thereby securely fastening cabinet 102 to the wall.

Ventilation for the equipment housed in cabinet 102 is provided by a series of offset holes, not shown, in an upper edge of cabinet 102. These offset holes are hidden by cabinet top 104 and align with complementary offset holes, not shown in cover 104.

Lid or top 104 is typically secured to cabinet 102 with a single security screw, not shown, that, in combination with a series of interlocks, not shown, allow ready access to an internal region of cabinet 102 by authorized service personnel.

The cabinet is finished with an electrostatically applied sintered metal, scratch resistant finish to maintain a good cabinet appearance in a potentially hostile environment.

It is believed that numerous alternate construction methods and materials may be known to those of skill in the art. Cabinets formed from such material or construction methods may be substituted for the steel cabinet 102 chosen for purposes of disclosure. Consequently, the invention is not considered limited to the cabinet chosen for purposes of disclosure. Rather, the invention is intended to include any suitable cabinet.

Openings 106 and 108 are provided in a front surface of enclosure 102 for a video monitor and a camera, respectively. Both openings 106 and 108 are covered with a transparent but destruction resistant polymer, not specifically identified. Suitable transparent materials include ⅜ inch thick Lexan®. Lexan® is a trademark of SABIC Innovative Plastics (formerly General Electric Plastics) brand of polycarbonate resin thermoplastic. It will be recognized that alternate material suitable for use in prisons may be known to those of skill in the art and any suitable material may be substituted for the Lexan® material chosen for purposes of disclosure. Lexan® covered openings 106 and 108 are considered to be resistant to most physical forces applied thereto, including bullets.

An institutional commercial grade telephone handset 110, also formed from a material suitable for a jail telephone system is connected to enclosure 102 by a steel sheathed cable 112 and a steel lanyard, not specifically identified.

A chrome steel handset cradle 114 is provided on the front surface of enclosure 102 to facilitate storage of handset 110 when not in active use. Cradle 114 is secured to cabinet 102 in a way to render its removal difficult.

An institutional keypad 116 is also provided on the front surface of enclosure 102. Keypad 116 is also constructed as a "jail-hardened" device to prevent vandalism or destruction. Keypad 116 is typically a USB connected device.

A video camera (typically a USB camera) is housed in enclosure 102 and aligned therein such that a camera lens, not specifically identified, is aimed forward through opening 108. A video monitor 120 is mounted within enclosure 102 and a front screen area thereof is aligned with monitor opening 106. In the embodiment chosen for purposes of disclosure, video monitor 120 is a 20 inch video monitor forming a part of a so-called all-in-one PC computer. An ASUS Model ET-2011 has been found satisfactory for the application. It will be recognized by those of skill in the art that other similar computers are or may become available and any suitable computer may be used. Consequently, the invention is not considered limited to the ASUS computer chosen for purposes of disclosure.

An electronic unit, shown schematically at reference number 122, typically implemented as part of the all-in-one PC computer, is housed within enclosure 102 and operatively connected to handset 110, camera 118, and video monitor 120. Electronic units such as electronic unit 122 are believed to be well known to those of skill in the video conferencing arts and, consequently, are not further discussed herein. In the embodiment chosen for purposes of disclosure, electronic unit 122 is the CPU of the all-in-one PC computer of which video monitor 122 is a part. Electronic unit 122 includes a power supply, not specifically identified, that is typically connected externally to an electrical power receptacle via an electrical power cord 124 terminating in a connector 126. Typically, electrical power cord 124 is not accessible to an inmate using inmate communication station 100. Only authorized personnel have access to electrical power cord 124.

In addition, electronic unit 122 includes a network communication interface, not specifically identified, that is typically designed to connect to an Ethernet or another standard network type via communication cable 128 terminating in a connector 130. The electrical cable 128 and connector 130 are also inaccessible to all but an authorized person. In the embodiment chosen for purposes of disclosure, connector 130 is a standard RJ-45 8 conductor connector.

It will be recognized that other configurations for a "jail-hardened" inmate communication stations may be substituted for the communication station 100 chosen for purposes of disclosure. Consequently, the invention is not considered limited to communication station 100. Rather, the invention is intended to include any suitable alternate inmate communication station configurations.

Figure 1B:
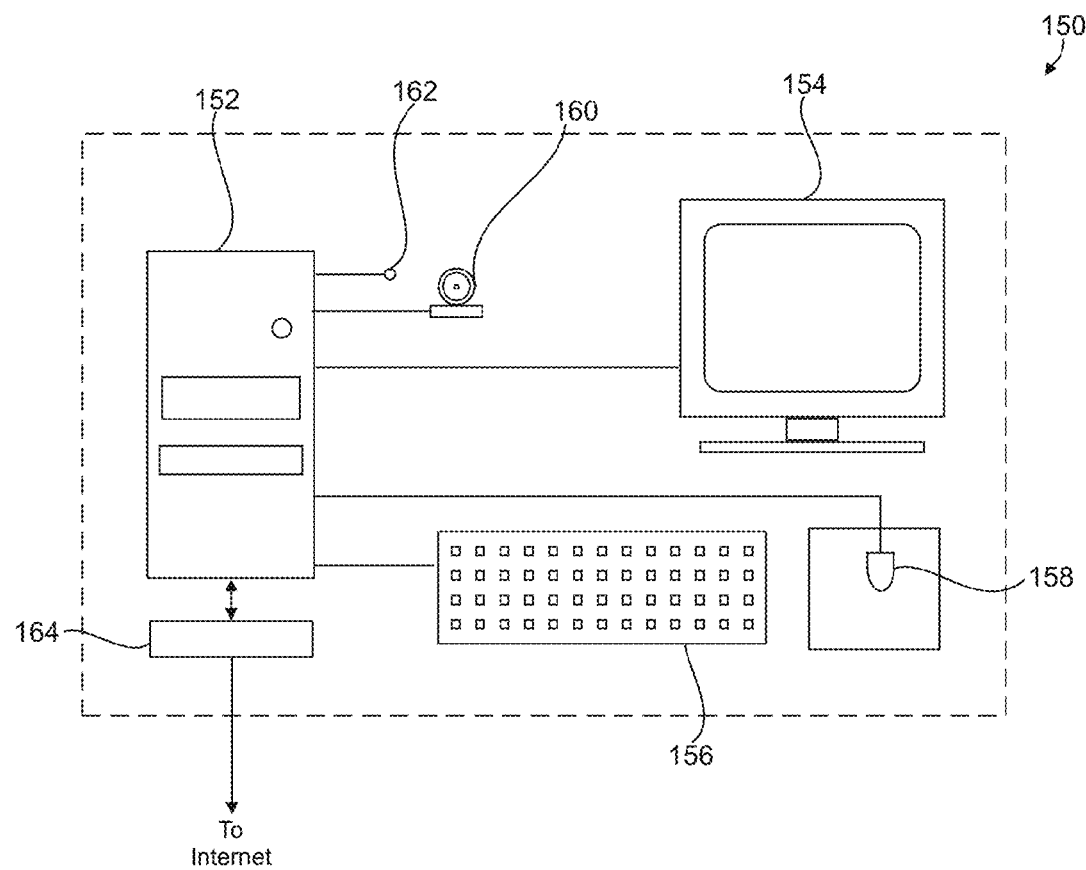
FIG. 1b is a simplified schematic block diagram of a web-enabled computer suitable for use as a visitor workstation.

Referring now also to FIG. 1*b*, there is shown a simplified schematic block diagram of a web-enabled computer suitable for use as a visitor workstation, generally at reference number 150. While a typical so-called "desktop" computer configuration is shown in FIG. 1*b* for purposes of disclosure, it will be recognized by those of skill in the art that any Internet enabled device may be substituted therefore. Such devices include, but are not limited to, smartphones, tablet computers, netbook computers, notebook computers, laptop computers, and dedicated Internet appliances, etc.

The exemplary Internet enabled computer system 150 has a CPU 152, a video monitor 154, a keyboard 156, a pointing device (e.g., a mouse) 158, and a modem 164, each operatively connected to CPU 152 In addition, a camera 160 and a microphone 162 are also operatively connected to CPU 152. A camera 160 and a microphone 162 complete a computer system suitable for use as a visitor computer system. Such system topologies as well as all included and/or attached components are believed to be well known to those of skill in the art. Consequently, neither the system topology nor any individual component are further described or discussed herein.

Figure 2:
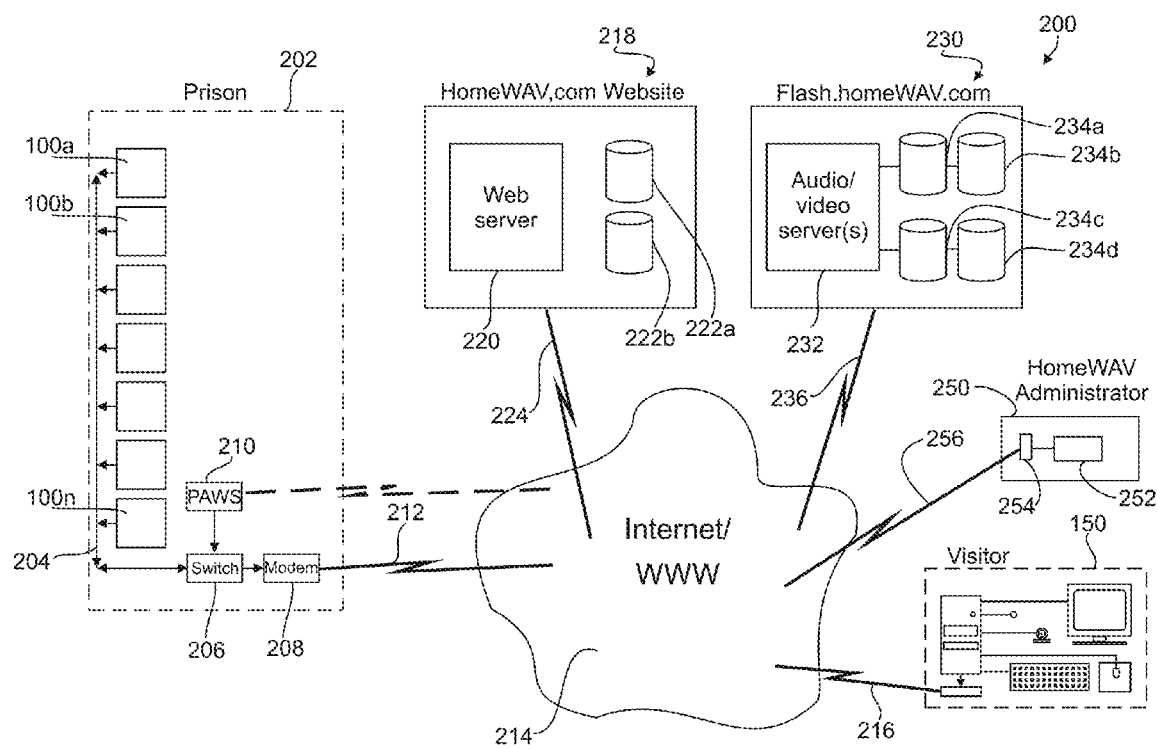
FIG. 2 is a simplified schematic diagram of a system suitable for use in practicing the method of the invention.

Referring now also to FIG. 2, there is shown a simplified system block diagram of the remote web-based visitation system (RWVS) in accordance with the invention, generally at reference number 200. For purposes of disclosure, a remote, web-based visitation system for prisons provided by HomeWAV, LLC, a limited liability company of the state of Virginia, located in Virginia Beach Va. is described. HomeWAV and HomeWAV Web Access Visitation are trademarks of HomeWAV, Inc.

A prison facility, 202 contains one or more inmate communication stations 100*a*, 100*b*, 100*n* typically disposed throughout prison 202. While most inmate communication terminals 100*a*, 100*b* . . . 100*n* are typically located in cell block common areas, not specifically identified, such terminals 100*a*, 100*b* . . . 100*n* may be placed at any other convenient locations throughout prison 202. In some prisons 202, public visitation terminals, not specifically identified, may be located in areas of the prison accessible to the public. Each inmate communication station 100*a*, 100*b* . . . 100*n* is connected to a network, shown schematically at reference number 204. Network 204 is supported by a network device 206, typically a multiport switch. It will be recognized that numerous network topologies may be implemented within prison 202. Consequently the invention is not considered limited to any particular network topology or any specific networking components.

Network component 206 is connected to an Internet interface, typically a modem 208. The type of modem 208 and the nature of the Internet connection depends upon the number of inmate visitation stations 100*a*, 100*b* . . . 100*n* at the prison 202. In the embodiment chosen for purposes of disclosure, modem 208 is a cable modem. As cable modems, as well as other Internet interface devices are believed to be well known to those of skill in the art, they are not further described or discussed herein. Consequently, the invention is not considered limited to the cable modem chosen for purposes of disclosure. Rather, the invention comprehends any and all network interface devices, known and to be invented.

A prison administrator workstation (PAWS) 210 may be located within prison 202 and also connected to either network 204 or directly to network controller (e.g., switch) 206. In alternate embodiments, PAWS 210 may have its own modem associated and connected directly to the Internet. Also PAWS 210 may be located outside prison 202 when desired.

An Internet connection 212 is provided between Internet interface/modem 208 and the Internet "cloud" represented schematically at reference number 214.

A visitor workstation or Internet "appliance" 150 discussed in detail hereinabove is also connected to Internet 214 via an Internet connection 216. Visitor workstation 150 is intended to represent a plurality of visitor workstations, each connected to Internet 214.

HomeWAV website 218 supports a web server 220. Web server 220 runs application code, not shown, that implements the applications of the novel remote web-based visitation system of the invention. In the embodiment chosen for purposes of disclosure, the applications, discussed in detail hereinbelow, are implemented in either JAVA or PHP (http://www.php.net). PHP is a server-side HTML embedded scripting language that provides web developers with a full suite of tools for building dynamic websites. In addition, some custom Adobe® Flash® ActionScript codes are provided to interact with flash.homewav.com 230 discussed in more detail hereinbelow. ActionScript is a dialect of ECMAScript (i.e., it is a superset of the syntax and semantics of the language more widely known JavaScript), and is used primarily for the development of websites and software targeting the Adobe Flash Player platform. ECMAScript is the scripting language standardized by Ecma International in the ECMA-262 specification and ISO/IEC 16262 specifications. The language is widely used for client-side scripting on the web.

It will be recognized that website design and implementation is believed to be well known to those of skill in the art. Consequently, alternate web development tools/languages may be utilized to develop similar applications. Consequently, the invention is not considered limited to the development tools and/or languages chosen for purposes of disclosure. Rather, the invention is intended to include any suitable languages, scripts, etc.

HomeWAV website 218 also embodies and supports storage, shown schematically at reference numbers 222*a*, 222*b* to contain application code and the databases necessary to implement the remote web-based visitation system of the invention.

A second website associated with the remote web-based visitation system of the invention is Flash.HomeWAV.com website 230. Flash.HomeWAV.com website 230 records and stores all audio/video (A/V) visits. As later discussed, certain A/V visits by clergy or legal representatives may be exempt from recording. Typically, all other A/V visits are recorded by one or more A/V servers 232. Storage devices, shown schematically at reference numbers 234*a* . . . 234*d* retain A/V transcripts of all visits not exempt from the recording requirement.

Finally, one or more HomeWAV Administrators at workstations 250 that include a computer 252 and a modem 254 and that are connected to the Internet by Internet connection 256 provide certain gate keeping and administrative functions by interacting with HomeWAV website 218. Such gate keeping and administrative functions are discussed in detail hereinbelow. The system of FIG. 2 is suitable for practicing the method of the invention. For brevity, the novel remote web-based visitation system for prisons is abbreviated RWVS. RWVS operates completely differently than any prison visitation system of the prior art. Two of the important differences between RWVS and the prior art include the feature that all visitation calls are initiated by inmates with no need for any intervention by prison personnel. All calls are automatically recorded (both audio and video) unless the call is between an inmate and a clergy person or a lawyer or another professional who has the right to privileged communication with the inmate. A flag in the visitor record of such a visitor automatically suspends recording.

A second unique feature of the RWVS of the invention is that prison personnel are not involved in collecting, or handling, the fees charged for using the system. Rather, RWVS is a pay-for-services based system wherein all money transactions are initiated by a visitor and all monies are recorded and tracked by the RWVS software. An online payment service such as PayPal® is used to receive payments from visitors or potential visitors. Received payments are credited to the visitor's account for use in visiting with a particular inmate. Generally, funds associated with one inmate may not be used for visitation with a different inmate. Also, deposited funds are associated with the visitor making the deposit and may not be used by a different visitor for visiting that inmate.

Before the RWVS is functional, administrative startup tasks must be performed, both by HomeWAV administrative personnel and prison administrative personnel at each prison.

A person wishing to utilize the HomeWAV system logs into the system in one of three user categories: as a visitor, as an inmate, or as an administrator. The features available to a visitor are first described.

Visitor Station

Figure 3:
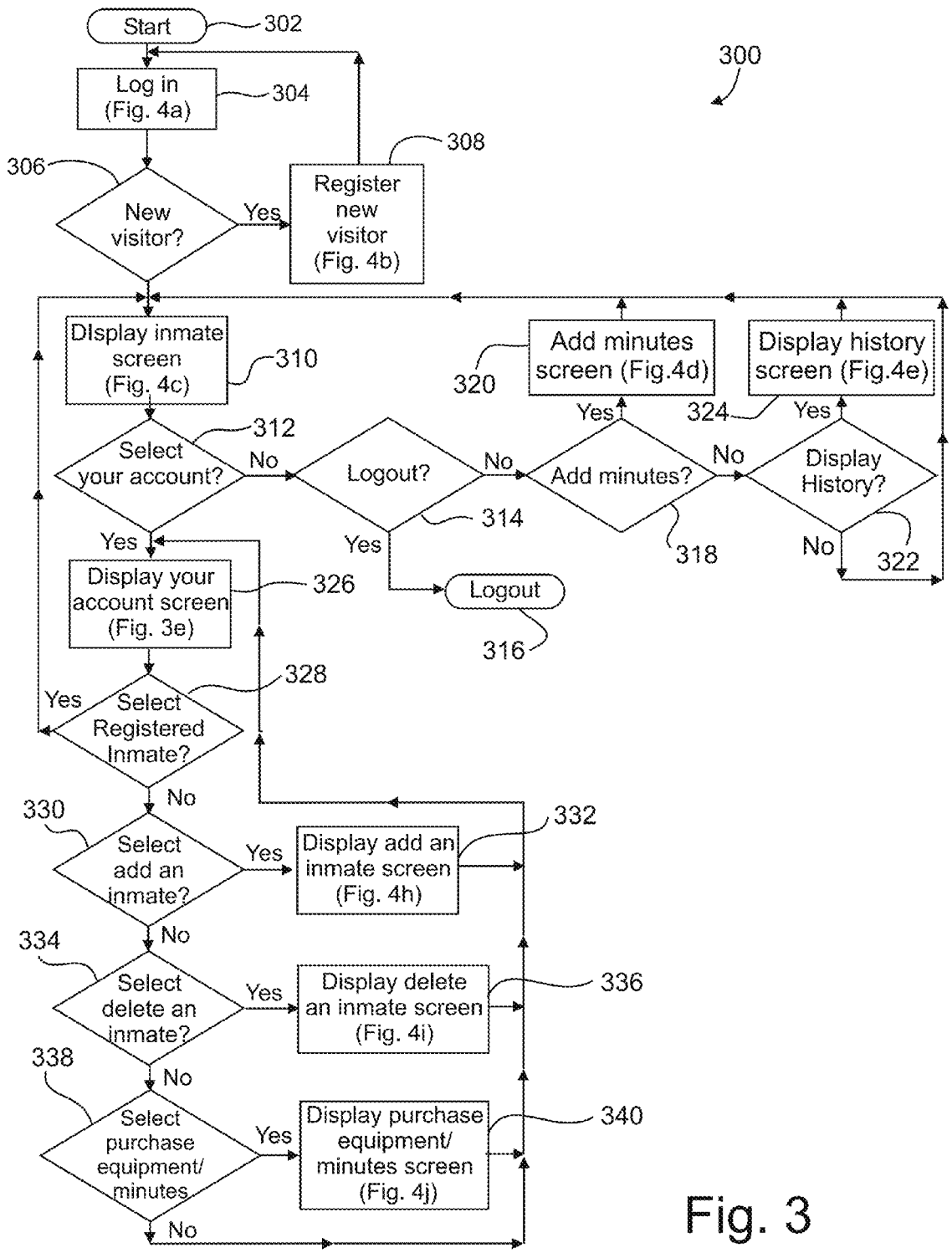
FIG. 3 is a simplified flow chart of the visitor process of the invention.
Figure 4A:
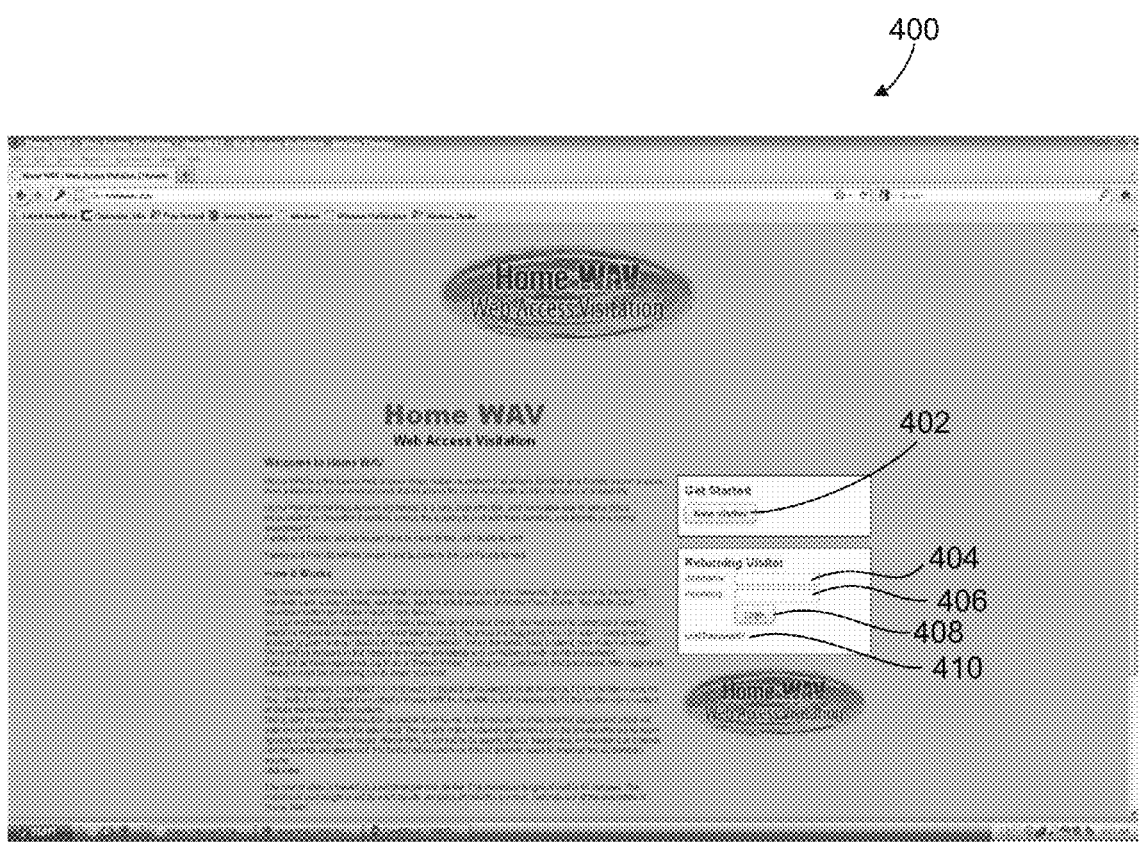
FIG. 4a is a screenshot of a login screen of the system for practicing the method of the invention.

Referring now also to FIG. 3, there is shown a simplified flow chart generally at reference number 300, of the operation of the HomeWAV features available to a visitor (i.e., a person outside the prison who will communicate (i.e., "visit") with an inmate in accordance with the method of the invention. The visitor process starts, block 302 with a login process 304. FIG. 4a is a screenshot of the HomeWAV login screen, shown generally at reference number 400.

Figure 4B:
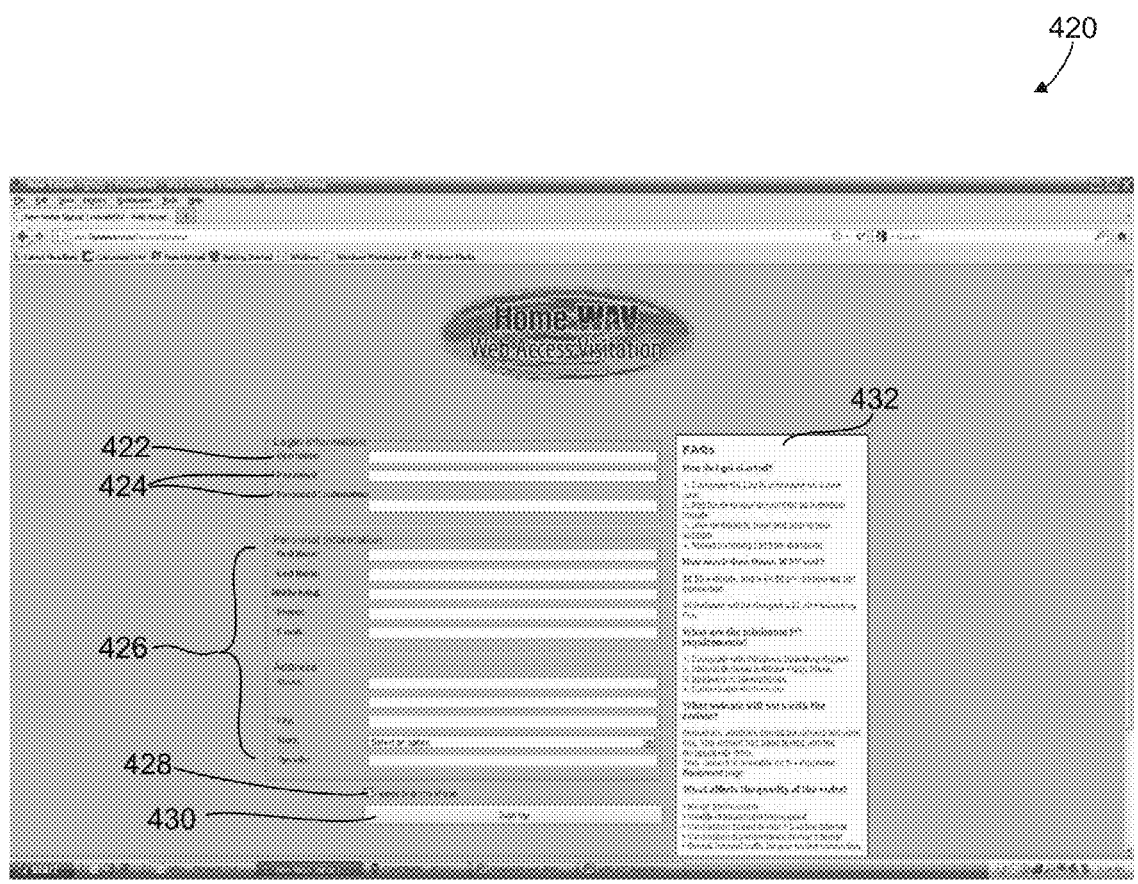
FIG. 4b is a screenshot of an add a new visitor screen of the system for practicing the method of the invention.

If the visitor is logging in for the first time, block 306, the "New Visitor" button 402 is selected and the new visitor is then directed to a new visitor screen 420 (FIG. 4b).

Referring now also to FIG. 4b, there is shown a screenshot of the new visitor screen, generally at reference number 420. A proposed user name 422 and a password 424 are entered. The user must then re-enter the password 424. After that, typical demographic information 426 is entered.

The new user is required to agree to the terms of use, button 428 and then select "Sign Up" button 430.

A FAQs section 432 is provided on screen to assist new users with their registration process.

If however, the visitor has already registered, block 306, he/she enters a user name 404 and password 406 and selects the "Login" button 408. In the event that the visitor has forgotten his/her password, the "Lost Password" button 410 may be selected for password help. If "Lost Password" button 410 is selected, the user is asked to enter his/her e-mail address and a reset password request is then forwarded to that address.

Upon entry of a valid username 404 and password 406 and pressing the login button 408 the visitor is logged into the HomeWAV system and immediately presented the Registered Inmate screen 440 (FIG. 4c), block 310.

Figure 4C:
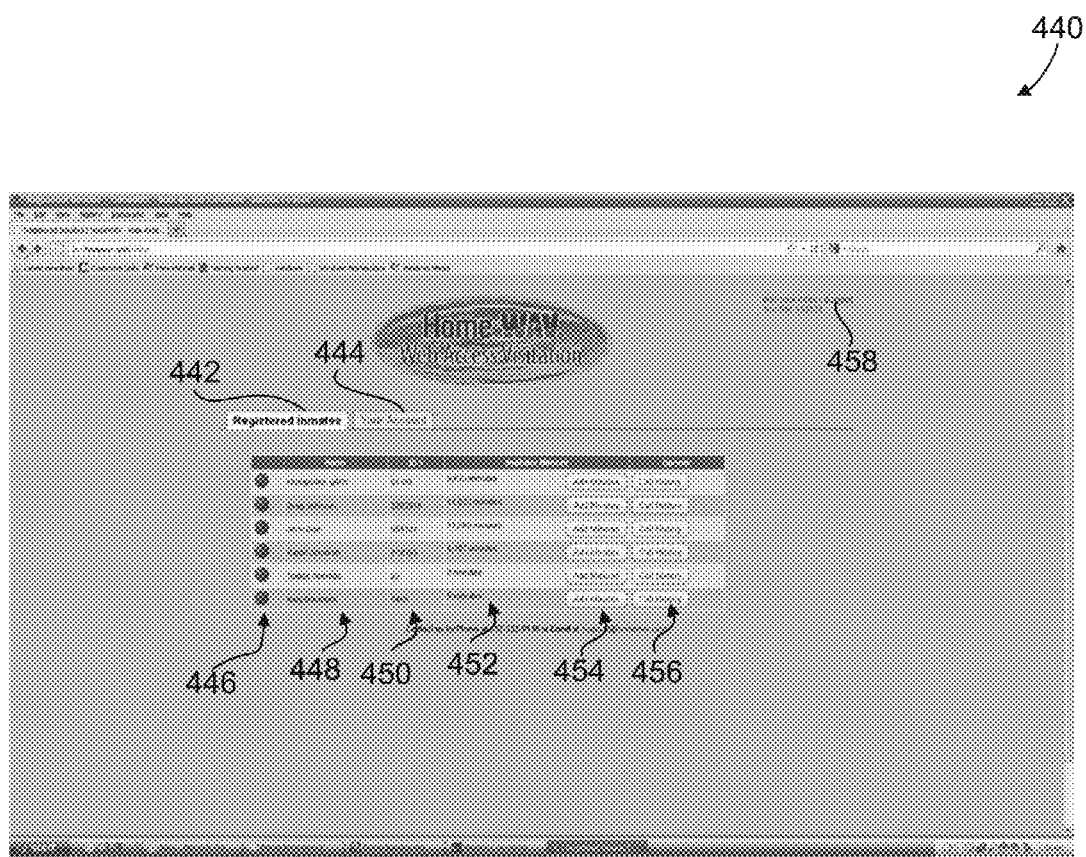
FIG. 4c is a screenshot of a registered inmate screen of the system for practicing the method of the invention.

Referring now also to FIG. 4c, there is shown a screen shot of the "Registered Inmates" screen 440. Several actions are available to the visitor: proceed to the "Your Account" screen 500 (FIG. 4f) selectable from the "Your Account" tab 444, or logout of the HomeWAV system, tab 458. Note that the "Registered Inmates" tab 442 does nothing as the visitor is already at the registered inmate screen 440.

Selecting link 458 allows the user to logout of the HomeWAV system.

The "Registered Inmates" screen 440 provides information relating to all inmates with which the visitor has registered and with whom a HomeWAV visit may be conducted. The Inmate Status Ball column 446 displays a colored ball indicating the current status of each registered inmate. The colors have the following meanings:

Red—Inmate not logged on and/or there are no funds available for a visit with the selected inmate. If this is so, the call is not allowed;

Green—Inmate is currently logged into the HomeWAV system at an inmate visitation station 100 and there are funds available to allow a visit.

A green ball indicates that the inmate is available to initiate a call. The process whereby an inmate initiates a call is discussed in detail hereinbelow.

The columns "Name" 448, and "ID Number" 450, are believed to be self explanatory.

Available minutes column 452 indicates the number of minutes in the visitor's account available for a visit with the selected registered inmate. Note that minutes purchased for visitation cannot be used for visitation with another inmate. Adjacent the remaining minutes value is an "Add Minutes" button 454 that allows the visitor to add additional minutes when necessary.

Selecting the "Add Minutes" button 454 associated with any registered inmate transfers a visitor to an "Add Minutes" screen 460 (FIG. 4d) to which the user is directed.

Figure 4D:
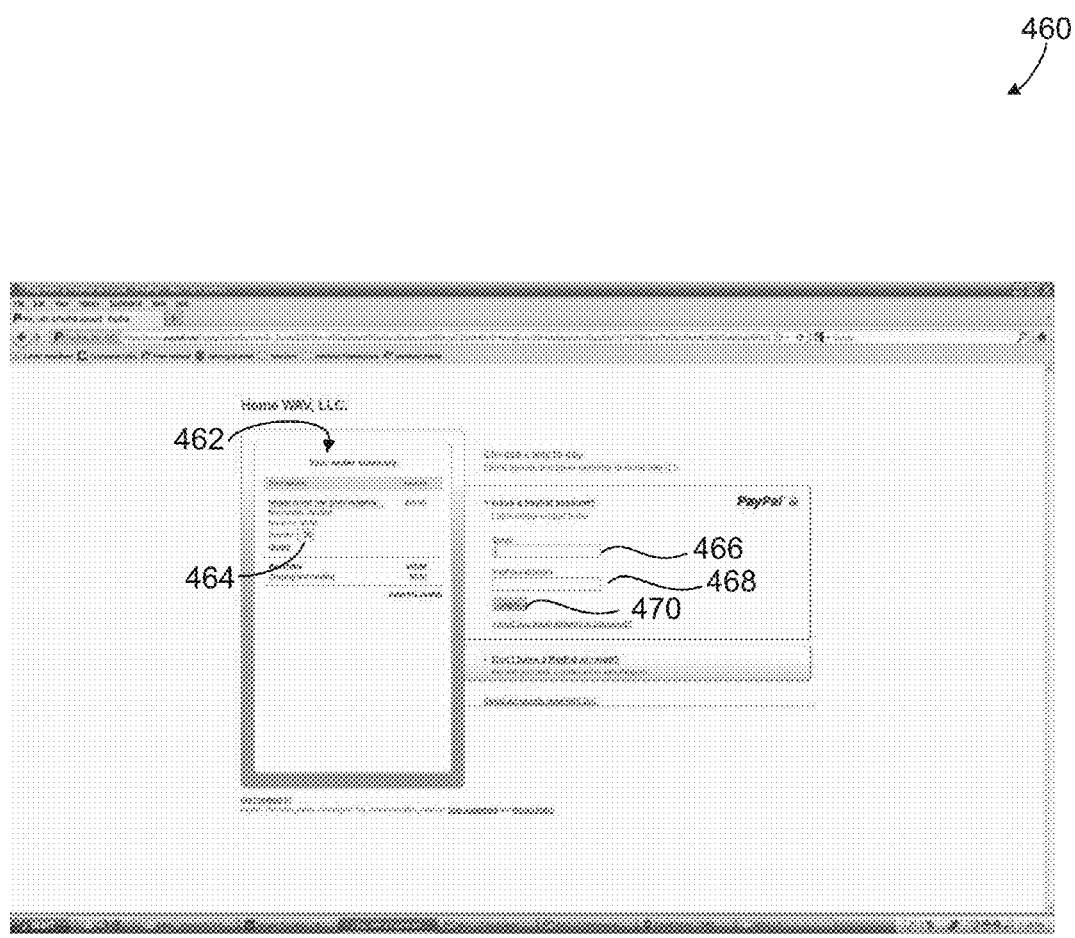
FIG. 4d is a screenshot of an add minutes screen of the system for practicing the method of the invention.

Referring now also to FIG. 4d, there is shown an "Add Minutes" screen 460. An "Order Summary" block 462 displays the selected inmate name. An "Order Quantity" box 464 allows the visitor to enter the number of minutes he/she wishes to purchase for visitation with the inmate.

For purposes of disclosure PayPal® has been chosen as the online payment service through which a visitor may purchase minutes for a selected inmate. PayPal® is believed to be well known to those of skill in the art and is, therefore, not further discussed herein. It will be recognized that any alternate online payment service may be used in addition to or in place of PayPal® to purchase visitation minutes. Consequently, the invention is not considered limited to any particular on-line funds collection and/or transfer agent. Funds paid through PayPal® or the like to purchase minutes are automatically transferred to HomeWAV server 220 (FIG. 2) and are typically recorded and made available to a visitor's account for use in as little as 15 seconds.

A HomewWAV visitor is assumed to have a PayPal® or other equivalent account and enters his/her e-mail address 466 and password 468 and then clicks the login button 470. When the PayPAl® transaction has been completed, the user is returned to the Registered Inmate screen 440 (FIG. 4c).

Figure 4E:
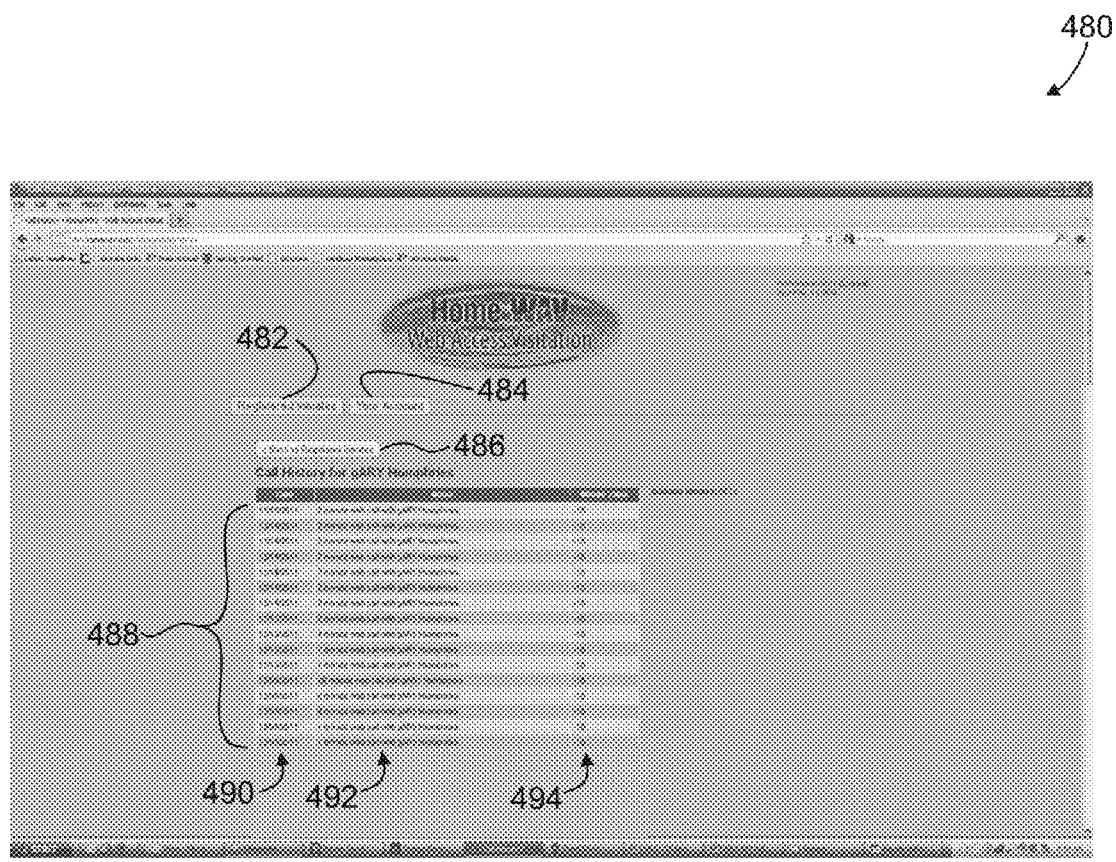
FIG. 4e is a screenshot of a call history screen of the system for practicing the method of the invention.

"Call History" button 456 allows a user access to a call log for a selected inmate. Referring now also to FIG. 4e there is shown a screen shot of a portion of a call history or call log for the selected inmate, generally at reference number 480.

Two navigation buttons, "Registered Inmates" 482 and "Your Account" 484 are provided. In addition a "Return to Registered Inmates" button 486 performs identically to "Registered Inmates" button 482. Call log records 488 each show a date 490, a duration and inmate name 492, and the billed time 494 for the call. Billed time 494 is based upon the minimum number of minutes billed for a call regardless of the actual call duration. Typically there is no minimum call length.

Selecting any "Your Account" button, for example "Your Account" button 484 on "Call History" screen 480 directs the user to the "Your Account" screen 500 (FIG. 4f), block 326. For simplicity, not all paths to block 316 are included on flow chart 300.

From "Your Account" screen 500, four actions are possible. First, a user may return to the "Registered Inmate" screen 440 (FIG. 4c). In addition, the user may select one of three other functions: "Add an Inmate" button 506, "Delete an Inmate", button 508, and "Purchase Equipment/Minutes", button 510.

If the user selects "Registered Inmate" button 502, block 328, he/she is returned to "Registered Inmate" screen 440 (FIG. 4c), block 310. If, however, the user selects "Add an Inmate" button 506, block 330, he/see is transferred to "Add an Inmate" screen 520 (FIG. 4g).

Figure 4F:
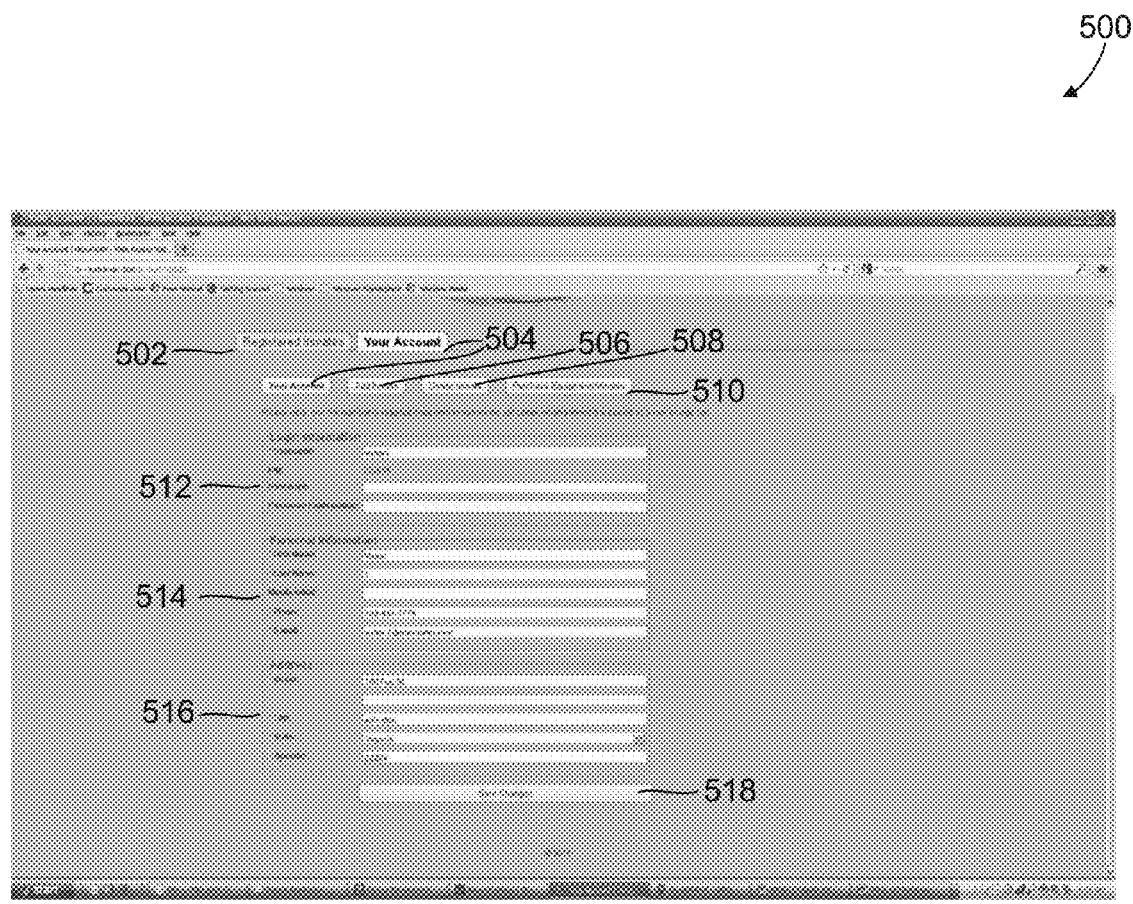
FIG. 4f is a screenshot of "your account" screen of the system for practicing the method of the invention.
Figure 4G:
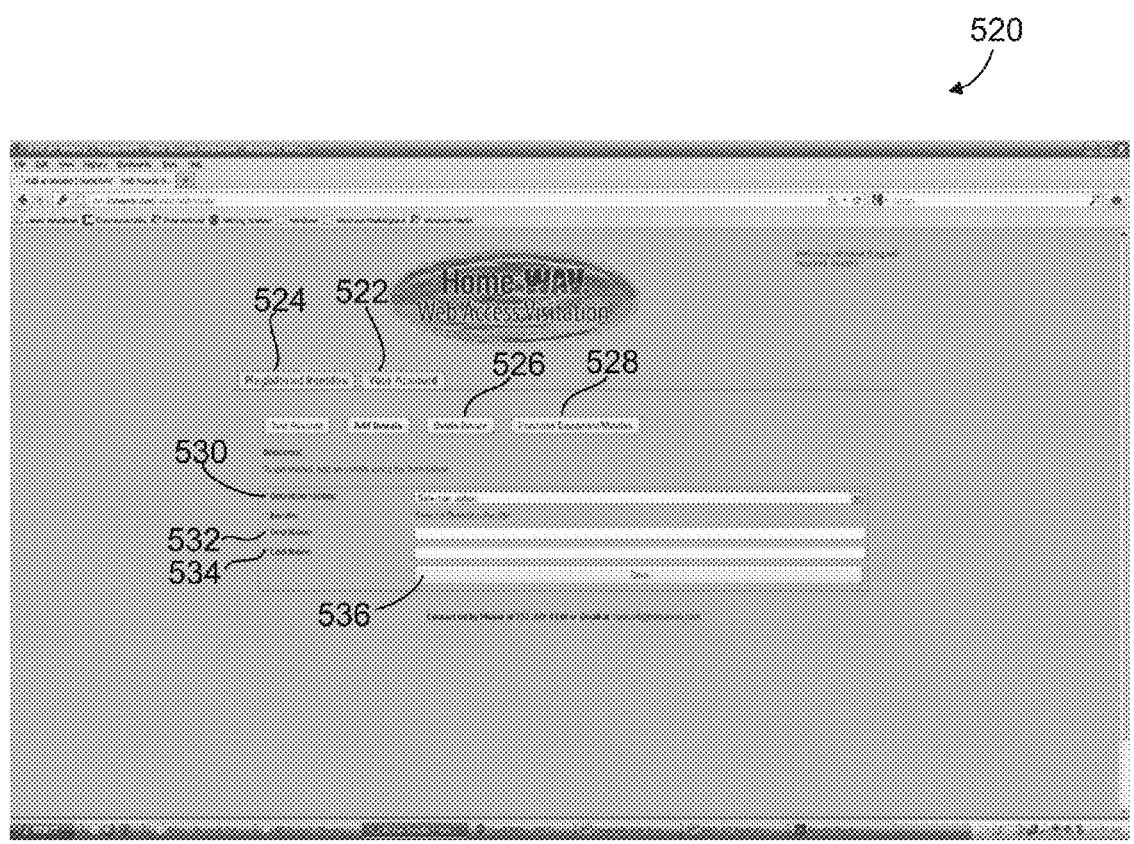
FIG. 4g is a screenshot of an add a new inmate screen of the system for practicing the method of the invention.

Selecting the "Your Account" button 522 returns the user to the "Your Account" screen 500 (FIG. 4f).

Selecting the "Registered Inmate" button 524 returns the user to the "Registered Inmate" screen 440 (FIG. 4c).

Figure 4H:
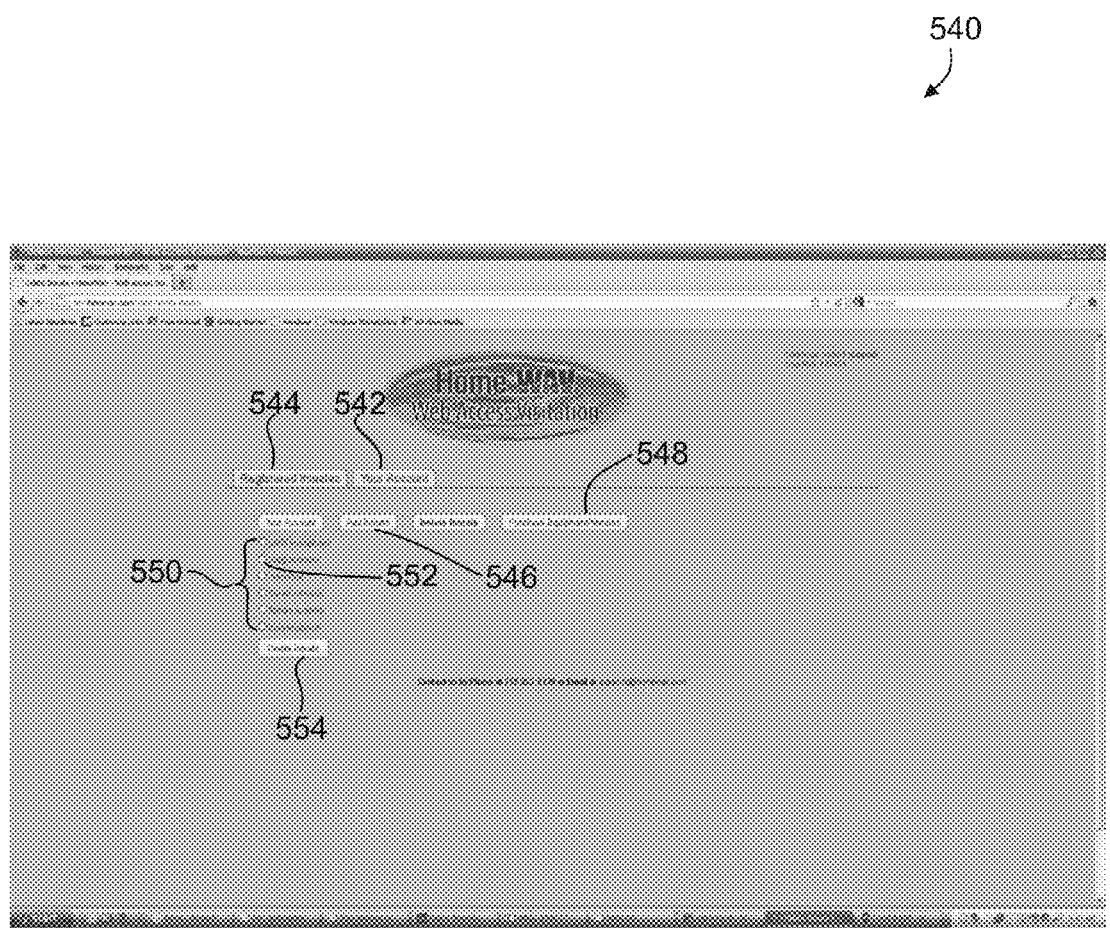
FIG. 4h is a screenshot of a delete an inmate screen of the system for practicing the method of the invention.

Selecting "Delete Inmate" button 526 transfers the user to the "Delete Inmate" screen 540 (FIG. 4h).

When registering a new inmate, the visitor first selects the detention facility (i.e., prison) housing the inmate to be registered using a pull down list box 530.

Once the detention facility has been selected, the visitor enters the inmate's first and last name, 532, 534, respectively.

Finally, the visitor selects "Save" button 536 to save the inmate information to the HomeWAV web server 220 (FIG. 2).

Referring now also to FIG. 4h, there is shown a screenshot 540 of the delete an inmate process.

Selecting the "Your Account" button 542 returns the user to the "Your Account" screen 500 (FIG. 4f).

Selecting the "Registered Inmate" button 544 returns the user to the "Registered Inmate" screen 440 (FIG. 4c).

If the visitor selects "Add an Inmate" button 546, he/she is transferred to the "Add an Inmate" screen 520 (FIG. 4g).

A list of inmates 550 registered by the visitor is shown on screen 540, each having a radio button control 552 adjacent each listed inmate name 550. Only one radio button 552 is labeled to maintain clarity of screen 540. Selecting the radio button 552 adjacent the name of the inmate from list 550 who is to be deleted, and then selecting "Delete Inmate" button 554 deletes (i.e., unregisters) the selected inmate at the HomeWAV server 220. If the visitor selects "Purchase Equipment/Minutes" button 548, he/she is transferred to the "Purchase Equipment/Minutes" screen 560, (FIG. 4i).

Figure 4I:
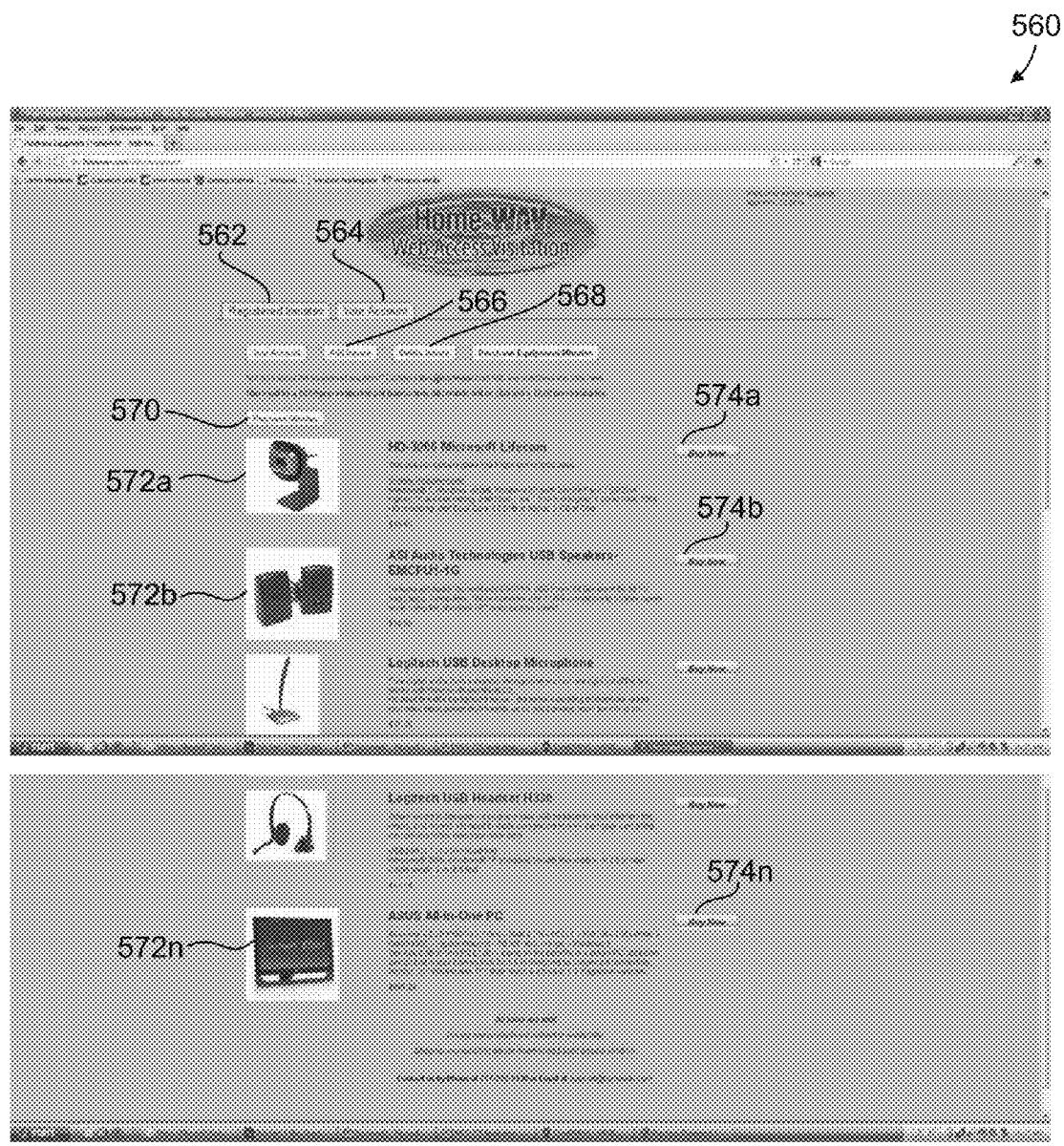
FIG. 4i is a screenshot of a purchase equipment/minutes screen of the system for practicing the method of the invention.

Referring now also to FIG. 4i, there is shown the "Purchase Equipment/Minutes" screen 560.

Selecting the "Your Account" button 564 returns the user to the "Your Account" screen 500 (FIG. 4f).

Selecting the "Registered Inmates" button 562 returns the user to the "Registered Inmates" screen 440 (FIG. 4c).

Selecting the "Add Inmate" button 566 transfers the visitor to the "Add an Inmate" screen 520 (FIG. 4g).

Selecting the "Delete Inmate" button 568 transfers the visitor to the "Delete Inmate" screen 540 (FIG. 4h).

Selecting the "Purchase Minutes" button 570 returns the visitor to "Registered Inmates" screen 440 (FIG. 4c) where button 454 associated with the inmate name 448 for which additional minutes are required is used to add the minutes. A series of equipment 572a, 572b . . . 572n is displayed. Any equipment 572a, 572b . . . 572n may be purchased by selecting the associated "Buy Now" button 574a, 574b . . . 574n.

As has previously been mentioned, all visitation calls are initiated by an inmate. The process whereby an inmate initiates a call is described in detail hereinbelow.

To receive a call, a visitor logs into the HomeWAV system as previously described and then selects the "Registered Inmate" screen 440 (FIG. 4c). As previously discussed, Inmate Status Ball column 446 displays a colored ball indicating the current status of each registered inmate. Any inmate displaying a green ball is on-line and may initiate a call.

Figure 4J:
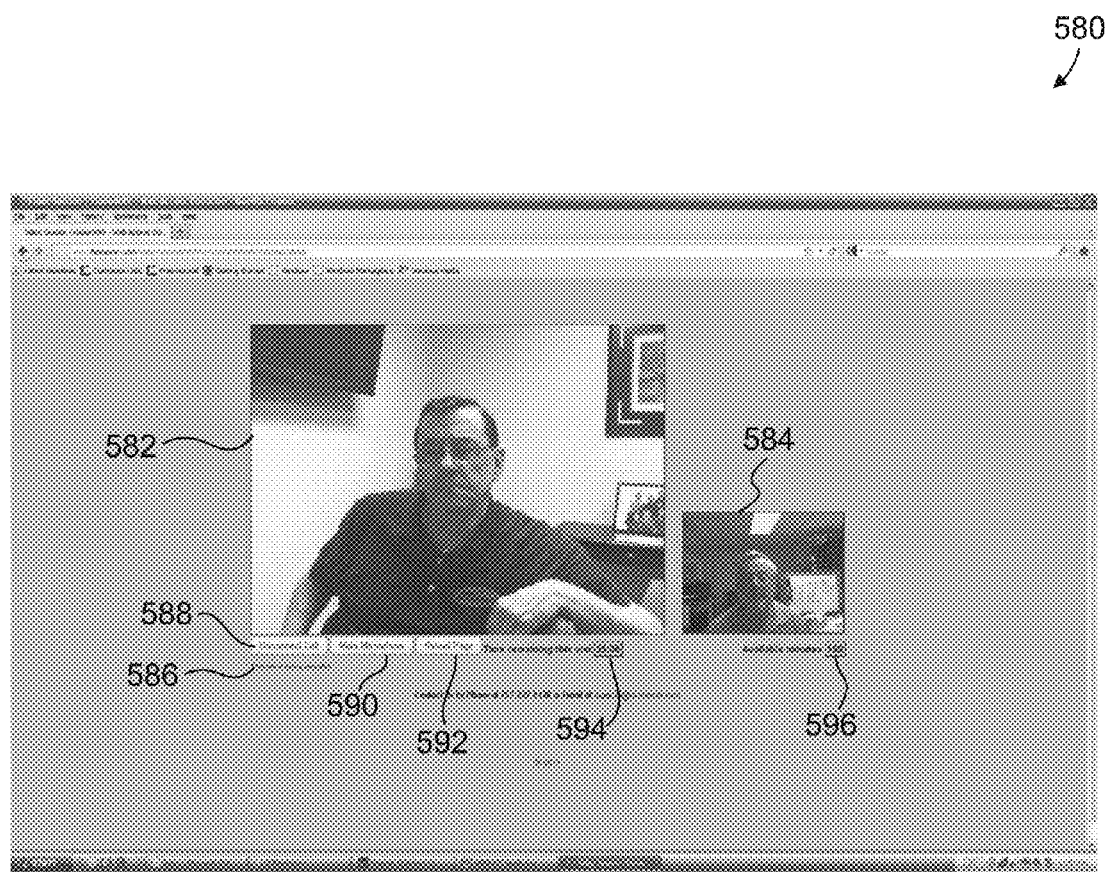
FIG. 4j is a screenshot of a visit screen of the system for practicing the method of the invention.

When an inmate initiates a call, a ringing sound is heard through speakers 160 at the visitor station 150 at which the visitor is logged into the HomeWAV system. A pop up box also appears on the screen showing the name of the calling inmate. An "Answer" button in the pop-up box is selected to answer the call. Referring now to FIG. 4j, there is shown a screen 580 that is displayed once the call is answered. An image of the calling 582 is displayed at the left side of screen 580 while a smaller image 584 of the visitor is displayed at the right side of the screen 580.

A message 586 reminds the visitor that the call is being recorded.

The visitor may terminate the call using "Disconnect Call" button 588.

The visitor may mute his/her microphone 162 (FIG. 1b) sing "Mute Microphone" button 590.

The time remaining for the call based upon the maximum allowable call length is displayed at reference number 594.

Finally, the number of minutes remaining in the account for the inmate to which the visitor is currently "talking" is displayed at reference number 596.

Inmate Station

Figure 5A:
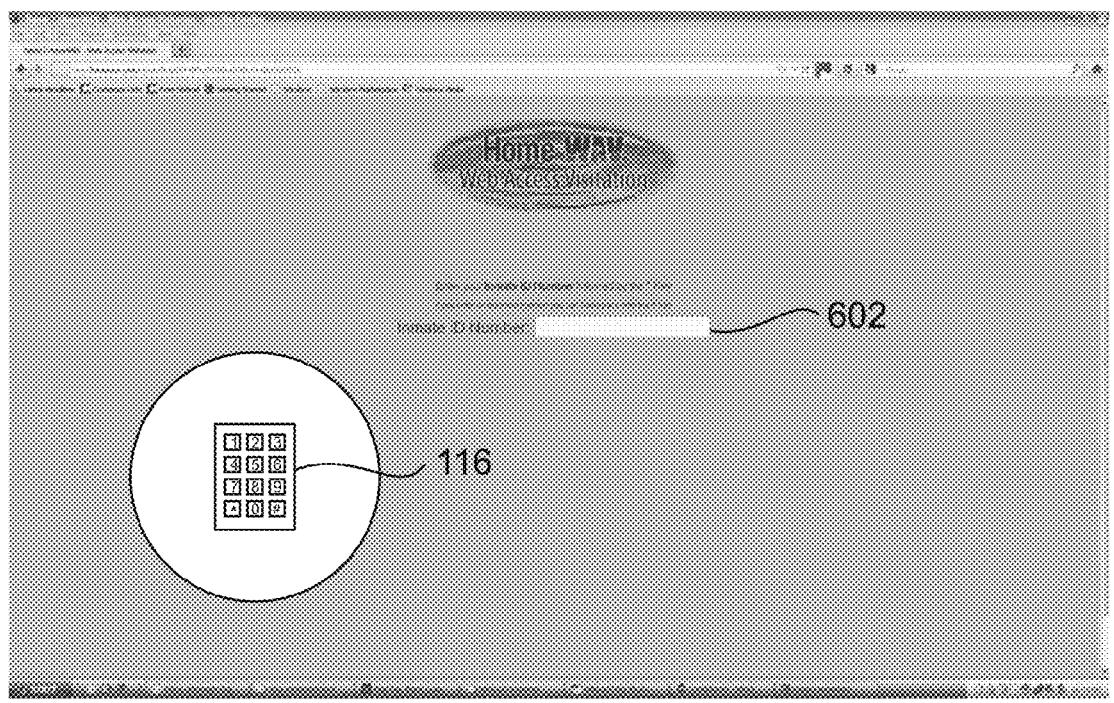
FIG. 5a is a screenshot of a first portion of an inmate's login screen of the system for practicing the method of the invention.

Up to this point, the HomeWAV system has been described from the perspective of a visitor. The system as utilized by an inmate is now described. Referring now also to FIG. 5a, there is shown a screenshot of an inmate sign in screen, generally at reference number 600. A schematic representation of keypad 116 forming a part of a "jail-hardened" terminal forming an inmate communication station 100 as shown in FIG. 2. Keypad 116 is the only device available to an inmate with which to communicate at a "jail-hardened" inmate communication station 100.

A single field "Inmate ID#" 602 is available on screen 600. The inmate must enter his/her ID number using keypad 116. As there is neither an "Enter" key nor a "Backspace" key on keypad 116, the "*" is used as an enter key while the # is used as a backspace key. Consequently, when the inmate has entered his/her ID number, he/she presses the "*" key on keypad 116.

Figure 5B:
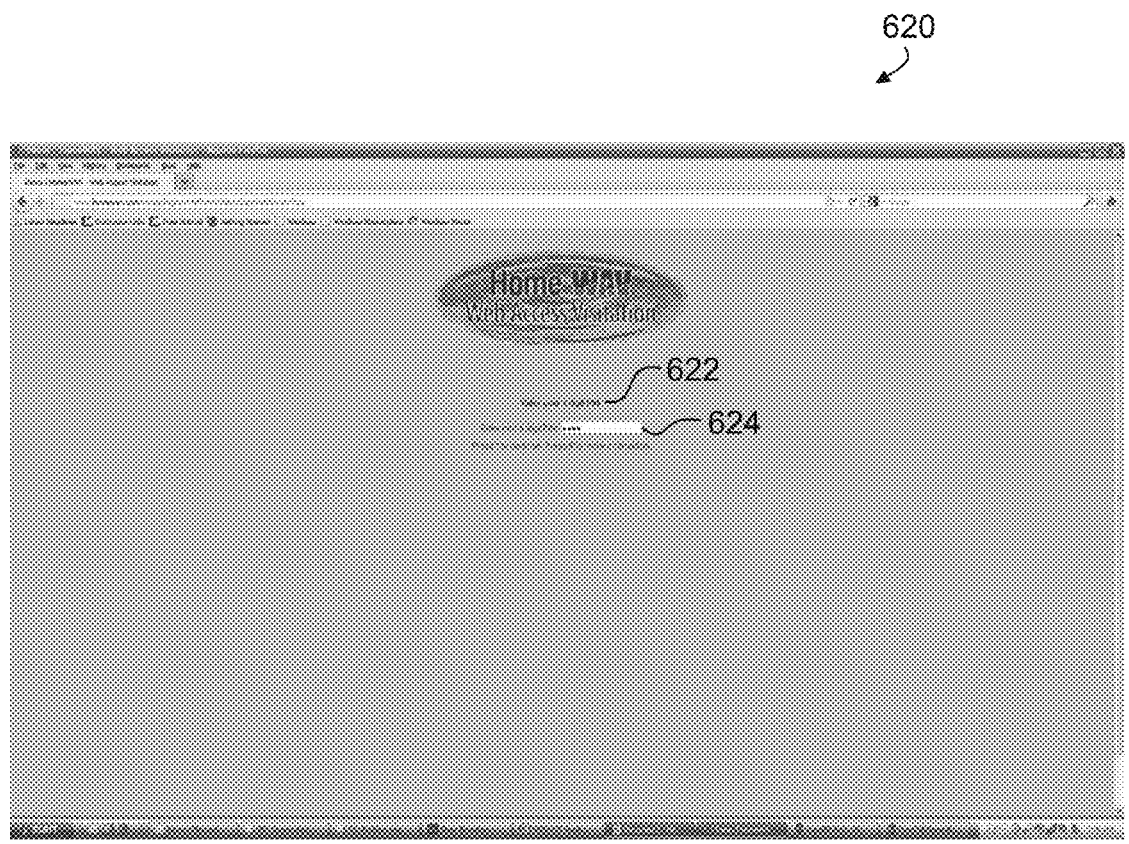
FIG. 5b is a screenshot of a second portion of an inmate's login screen of the system for practicing the method of the invention.

The inmate ID number is validated and, if not recognized, the inmate must reenter his/her ID number. Once the inmate ID is validated, an inmate PIN screen 620 (FIG. 5b) is displayed. Referring now also to FIG. 5b, there is shown an "Inmate PIN" screen 620. The inmate is instructed, REFERENCE NUMBER 622, to"ENTER" his/her PIN. The inmate then enters his/her PIN in field 624 using "*" as an enter key.

Once the entered PIN 624 is verified, a screen 640 appears that displays a list of the inmate's visitors and their availability status.

Figure 5C:
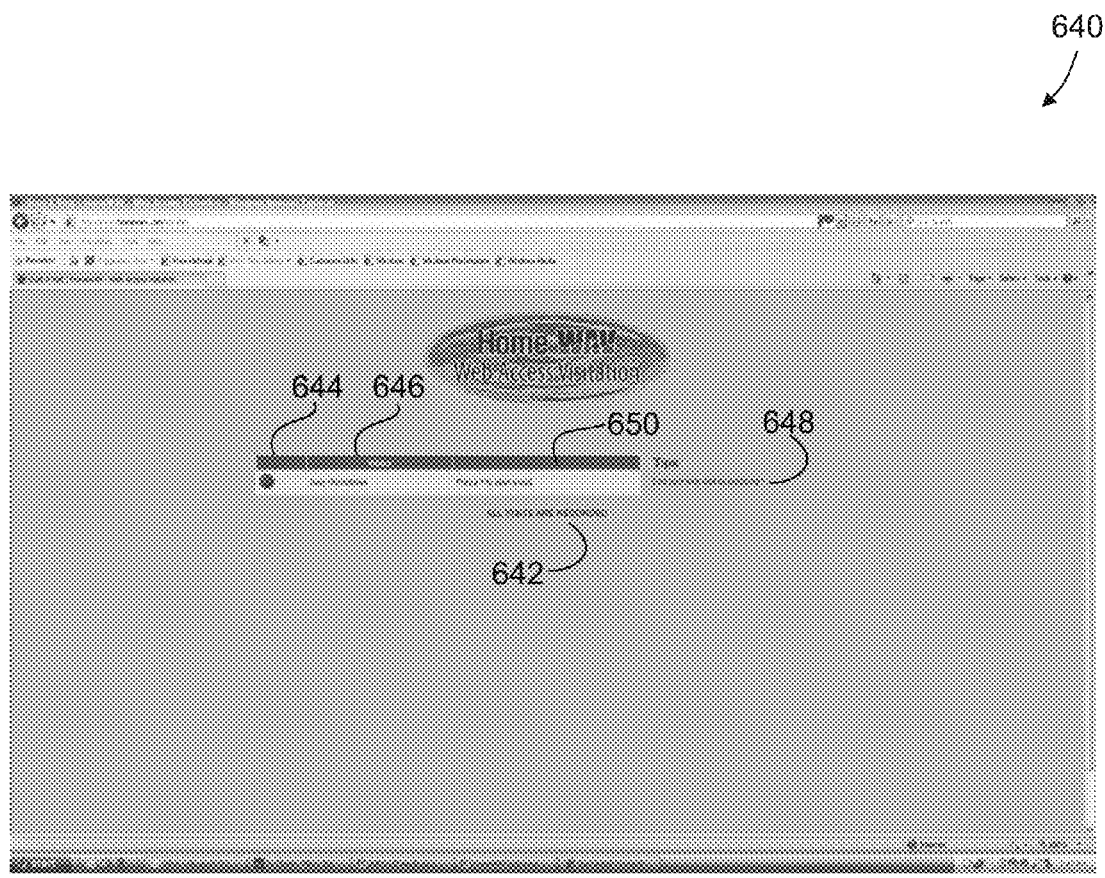
FIG. 5c is a screenshot of a begin visit screen of the system for practicing the method of the invention.

Referring now also to FIG. 5c there is shown a screenshot of a "Begin Visit" screen 640. The inmate is provided with a reminder 642 that "ALL VISITS ARE RECORDED." However, as discussed hereinbelow, certain visits with clergy, legal representatives, etc. are generally not recorded.

A second reminder 648 reminds the inmate that the web visit may be ended by pressing the "*" key on keypad 116 (FIG. 1a).

Figure 5D:
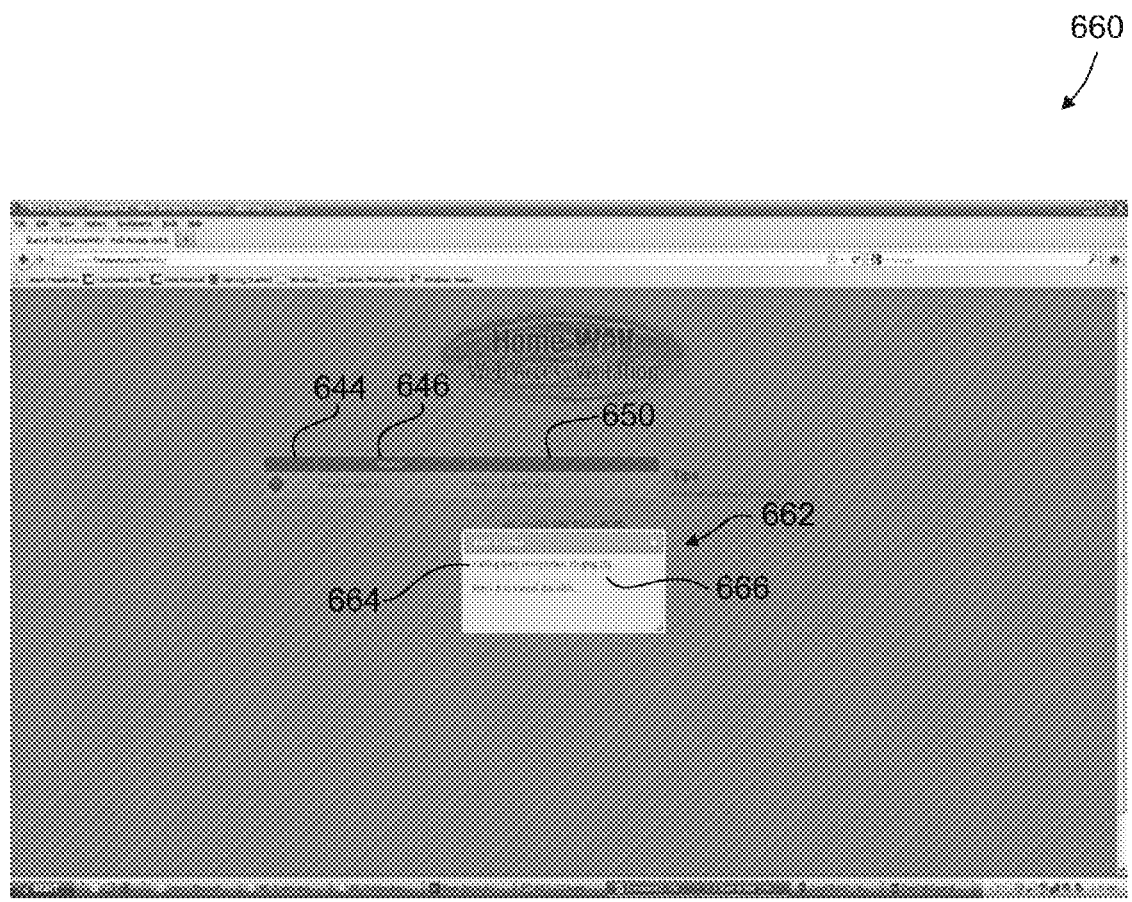
FIG. 5d is a screenshot of a call initiation screen of the system for practicing the method of the invention.

The names of one or more potential visitors are displayed, column 646, each with an associated visitor status ball 644. A particular number 650 is assigned to each listed visitor, which number must be entered on keypad 116 to initiate a visit with that visitor. Assuming that the visitor status ball is green, pressing the associated number 650 initiates the visiting process. If the visitor status ball is red, the visitor is not logged on and/or there are no funds available for a visit with this visitor, and accordingly no visit can be initiated. In such an event, the inmate can select an option to send a text message to the red status visitor, advising the visitor that the inmate is ready and desiring to initiate a visit. Referring now also to FIG. 5d, there is shown a screenshot of A "Begin Visit" screen 660 having a pop-up box 662 displayed thereupon. Pop-up box 662 shows the name 664 of the visitor being called and the number of rings 666.

Once the visitor "answers" the call, an "Inmate Visit Screen" 680 is displayed.

Figure 5E:
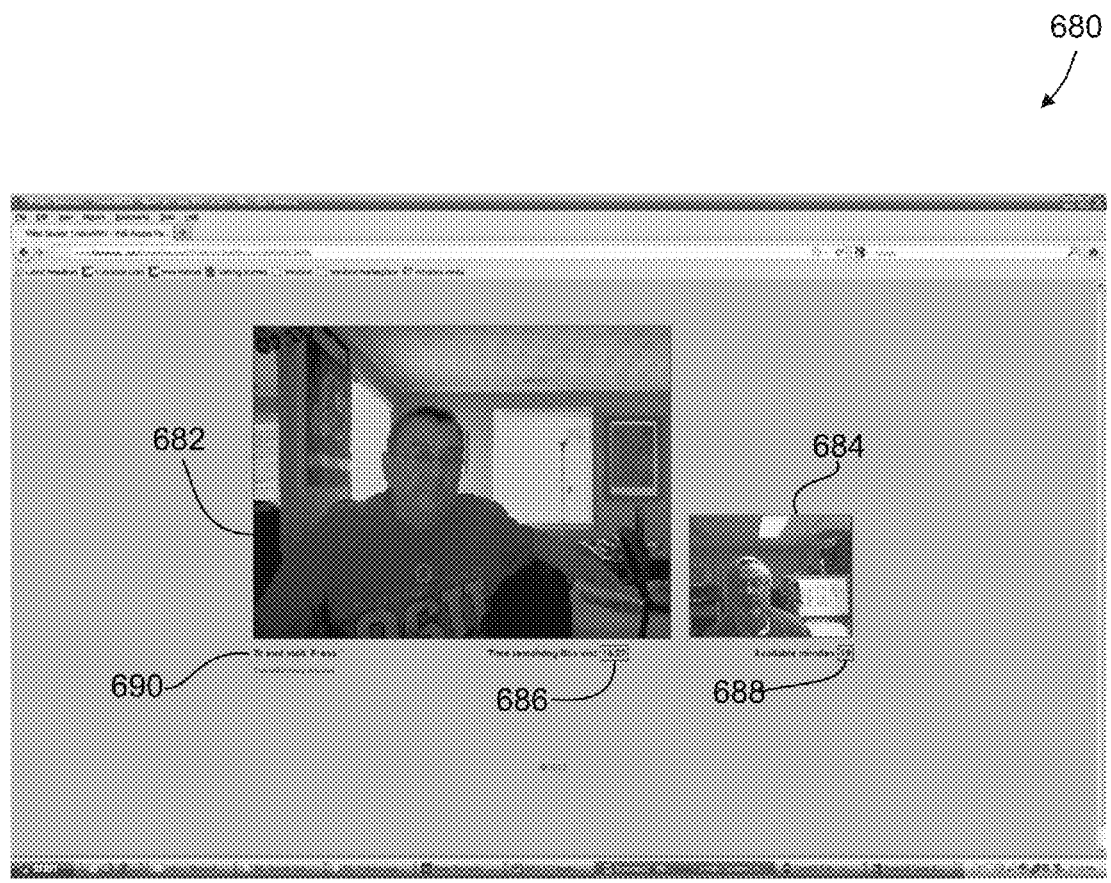
FIG. 5e is a screenshot of an inmate view of a visit screen of the system for practicing the method of the invention.

Referring now also to FIG. 5e, there is shown a screenshot of an "Inmate Visit" screen 680. An image 682 of the called visitor is displayed at the left side of screen 680 while a smaller image 684 of the inmate is displayed at the right side of screen 680.

The remaining available minutes for the call 686 are displayed beneath image 682. The remaining time 686 is based upon the maximum call length allowed as well as the minutes remaining in the visitor's account for the calling inmate.

Available minutes 688 are displayed beneath image 684.

To end the call (i.e., web visit), the inmate may simply press the "*" key on keypad 116.

Administrator Station

The third class of HomeWAV users is administrators. Some functions performed by HomeWAV administrative personnel using management software residing on web server 220 (FIG. 2) associated with the HomeWAV.com website 218 include:

Enter or Delete a prison
Assign Prison Administrators
Set cost per minute for calls
Delete Recorded Video
Set retention duration of archived recorded video Register Visitors including Name, Address, Phone, and Password
Reset a Visitor Password
Delete a Visitor
Manage Visitors minutes
Manage Purchase of Minutes
Track Used and unused minutes
Issue Credit for unused minutes
Update Inmate List as data is provided by a prison
Generate usage and other reports There are currently three classes of administrator defined within the HomeWAV system. The names and privileges (i.e., the allowable operations) of each of these classes of administrator are:

Class 1—Facility Manager
1) Manage Detention Facility
Can View Facility Information (i.e. Name, Location, Min/Max Call Length, Price per Minute).
Can modify the Facility Maximum Call Length.
Has the ability to disable all Calls
2) Manage Inmates
View Inmate Information (i.e. Name, ID #, Available Minutes).
Can disable calls for a specific Inmate.
Can Reset PIN for specific Inmate.
Can View List of Registered Visitors for a specific Inmate and have the ability to turn off their Record.
Can View Visitor Information (i.e. First and Last Name, Phone Number, Address)
Video Playback
a) Can playback recorded video for specific Inmates.
Manage operators
View operator information (i.e. Username, Email, Privileges).
Has the ability to edit operator information and privileges.
Class 2—Jail Administrator
Detention Facility
a) Can view facility information (i.e. Name, Location, Min/Max Call Length, Price-per-Minute).
Manage Inmates
View inmate information (i.e. Name, ID #, Available Minutes).
Can disable calls for a specific inmate. Reset PIN for a specific inmate.
View registered visitors for a specific inmate.
View visitor information (i.e. First and Last Name, Phone Number, Address).
3) Video Playback.
a) Playback recorded video for specific inmates.
Class 3—Monitor
1) Detention Facility
a) Can view facility information (i.e. Name, Location, Min/Max Call Length, Price-per-Minute).
2) Inmates
View inmate information (i.e. Name, ID #, Available Minutes).
View registered visitors for a specific Inmate.
View visitor information (i.e. First and Last Name, Phone Number, Address)
3) Video Playback
a) Playback recorded video for specific inmates An administrator logs into the HomeWAV system using login screen 400 (FIG. 4a). Once the administrator's user name 404 and password 496 are validated, he/she is immediately transferred to the "Manage Detention Facility" screen.

Figure 6A:
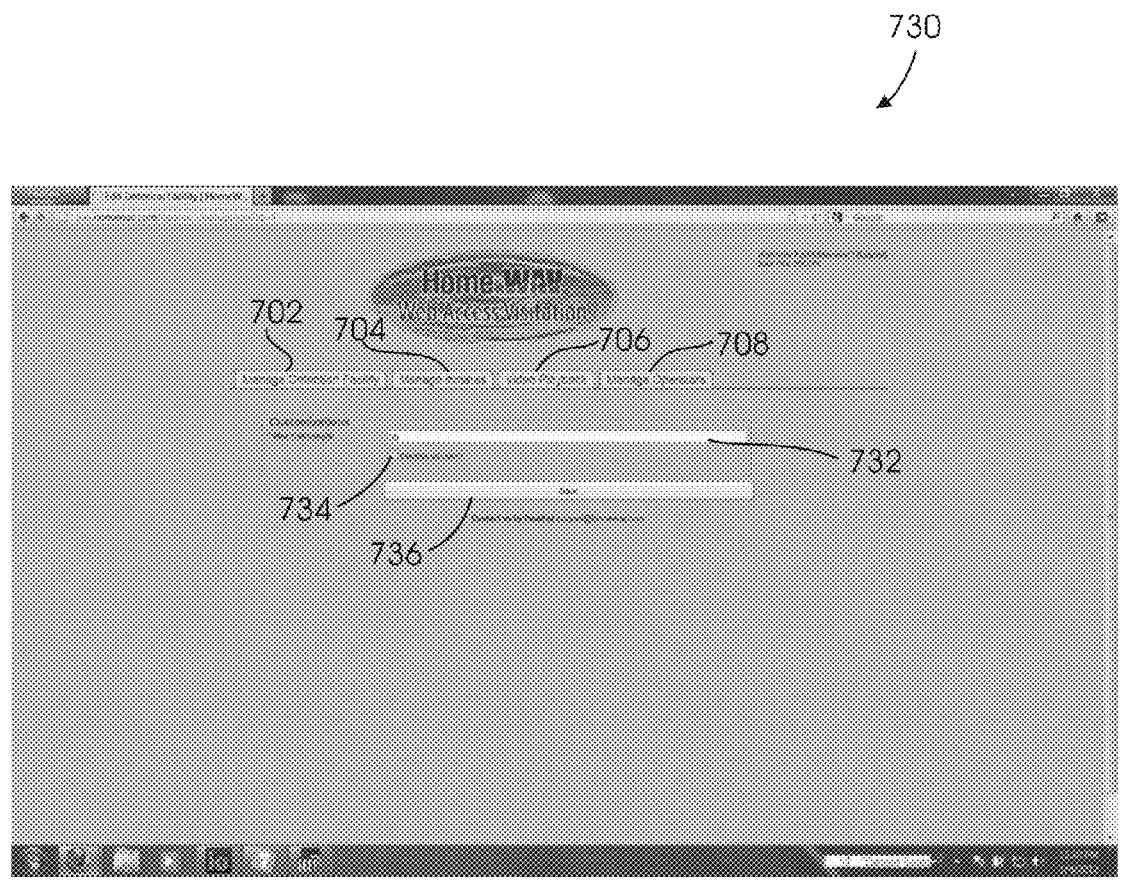
FIG. 6a is a screenshot of a manage detention facility screen of the system for practicing the method of the invention.

Referring now also to FIG. 6a, there is shown a screenshot of "Manage Detention Facility" screen 700.

"Manage Inmates" buttons 704, "Video Playback" button 706, and "Manage Operators" button 708 all direct the operator to different screens, each discussed in detail hereinbelow. Logout link 724 logs the operator out of the HomeWAV system.

Displayed on "Manage Detention Facility" screen 700 are the Facility Name 710, the Facility Location 712, Maximum Call Length 716, Cost per Minute 718, and All Calls Disabled 720.

Pressing "Update Detention Facility Settings" button 722 directs the operator to "Update Detention Facility Settings" screen 730.

Figure 6B:
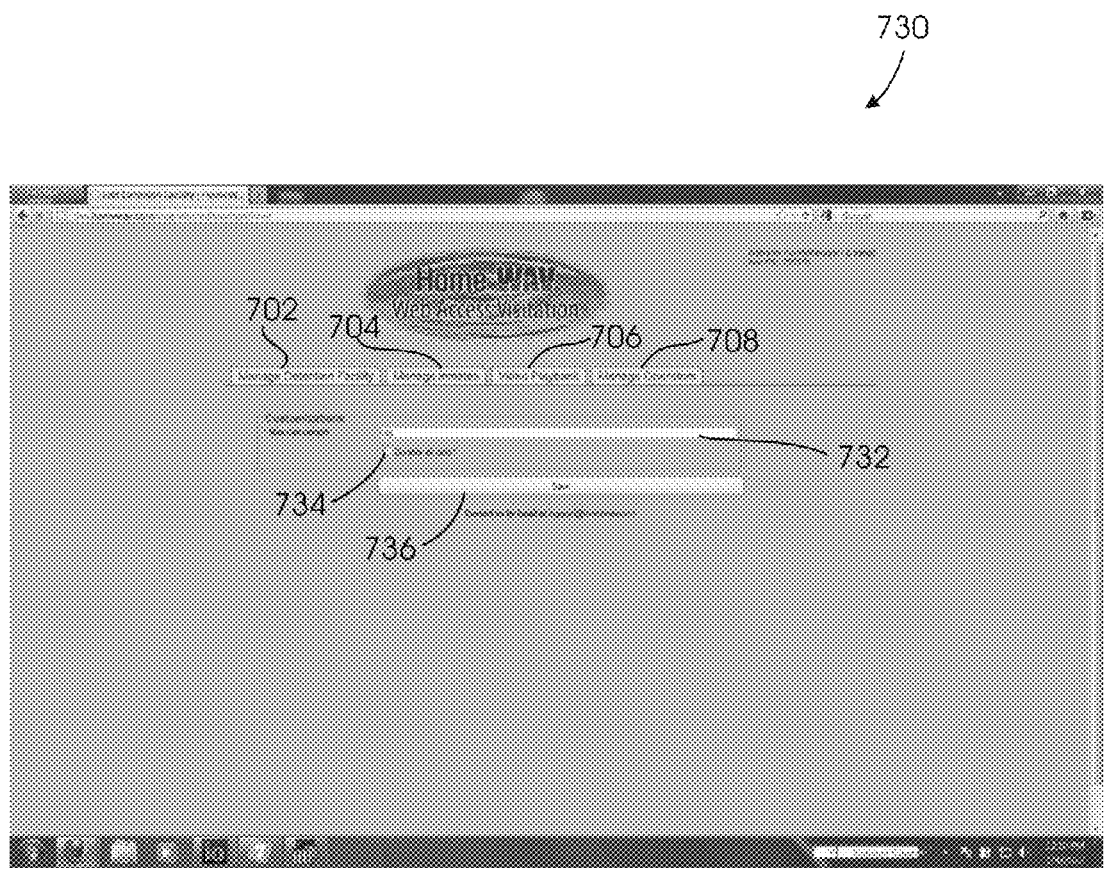
FIG. 6b is a screenshot of a disable calls screen of the system for practicing the method of the invention.

Referring now also to FIG. 6b, there is shown the "Update Detention Facility Settings" screen 730.

The Maximum Call Length value 732 may be set to a desired call length. All calls may be disabled for the facility by clicking check box 734.

Save button 736 records any changes made to the maximum call length or to the all calls disabled status.

The operator may return to "Manage Detention Facility" screen 700 by selecting button 702. Other actions "Manage Inmates", "Video Playback", and "Manage Operator" may be selected using buttons 704, 706, and 708, respectively.

If the operator selects "Manage Inmates" using button 704 from any screen, he/she is directed to the "Manage Inmates" screen 750.

Figure 6C:
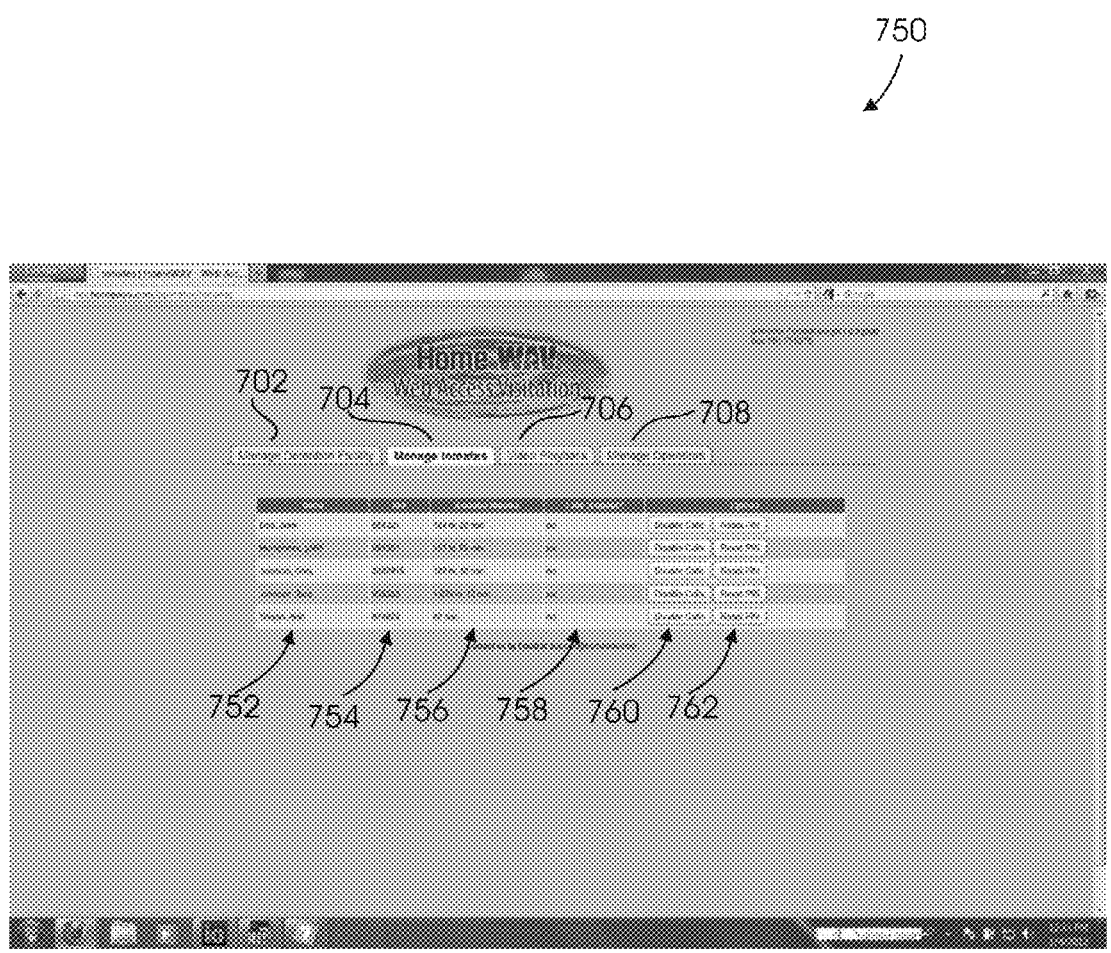
FIG. 6c is a screenshot of a manage inmates screen of the system for practicing the method of the invention.

Referring now also to FIG. 6c, there is shown the "Manage Inmates" screen 750.

A list of inmate names 752 reflects the registered inmate population of the selected detention facility. A column of associated PINs (Personal Identification Numbers) 754, Available Minutes 756, and Calls Disabled Status 758 are associated with each inmate name. Each inmate name 752 also has a "Disable Calls" button 760 and a "Reset Pin" button 762.

Selecting either "Disable Calls" or "Reset PIN" buttons 760, 762, respectively, does not transfer the operator to a different screen but merely presents a pop-up box requesting confirmation of the action.

As with previous screens, the operator may return to "Manage Detention Facility" screen 700 by selecting button 702. Other actions "Manage Inmates", "Video Playback", and "Manage Operators" may be selected using buttons 704, 706, and 708, respectively.

If an operator selects "Video Playback" from any screen using the "Video Playback" button 706, he/she is transferred to "Video Playback" screen 790.

Figure 6D:
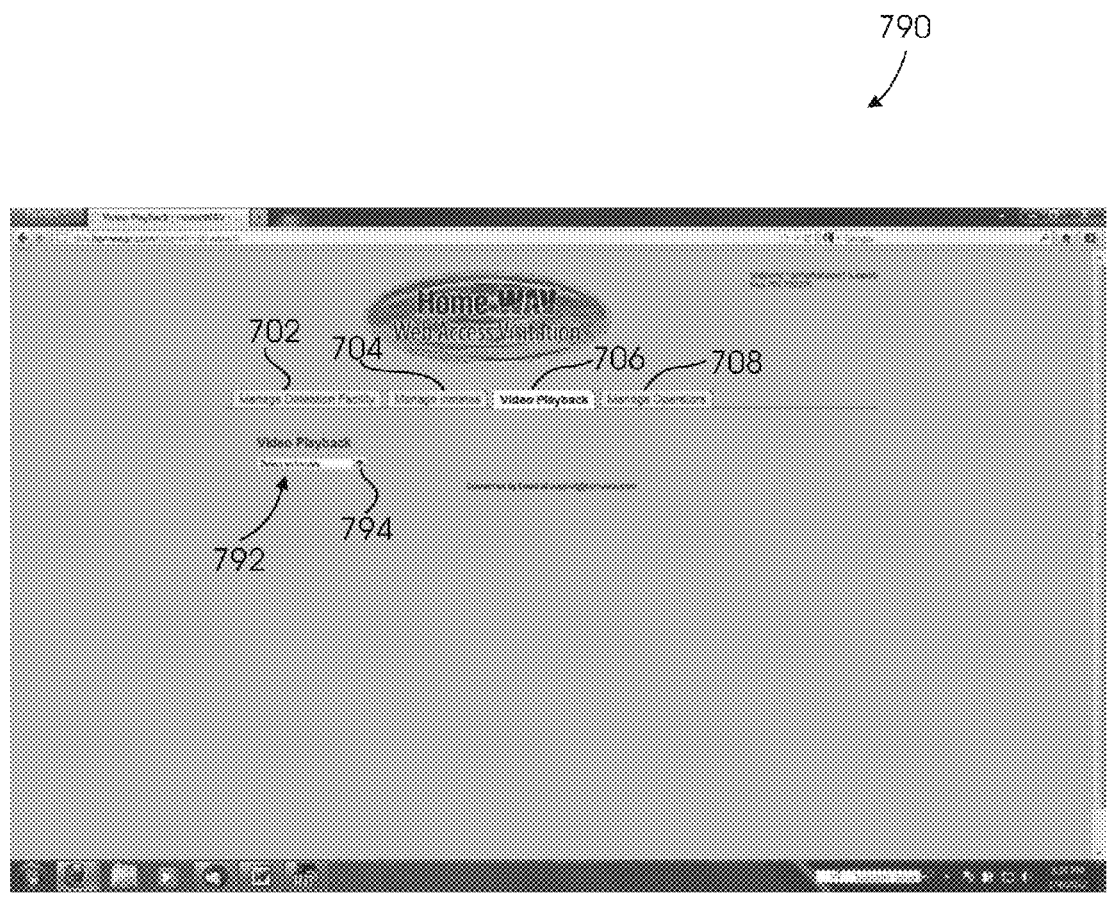
FIG. 6d is a screenshot of a video playback screen of the system for practicing the method of the invention.

Referring now also to FIG. 6d, there is shown a screenshot of the "Video Playback" screen 790.

A pull-down list box 792 activated by control 794 displays all inmates of the detention facility that have registered with the HomeWAV system. Selecting an inmate from the list of inmates transfers the operator to "Video Display" screen 810.

As with previous screens, the operator may return to "Manage Detention Facility" screen 700 by selecting button 702. Other actions "Manage Inmates", "Video Playback", and "Manage Operators" may be selected using buttons 704, 706, and 708, respectively.

Figure 6E:
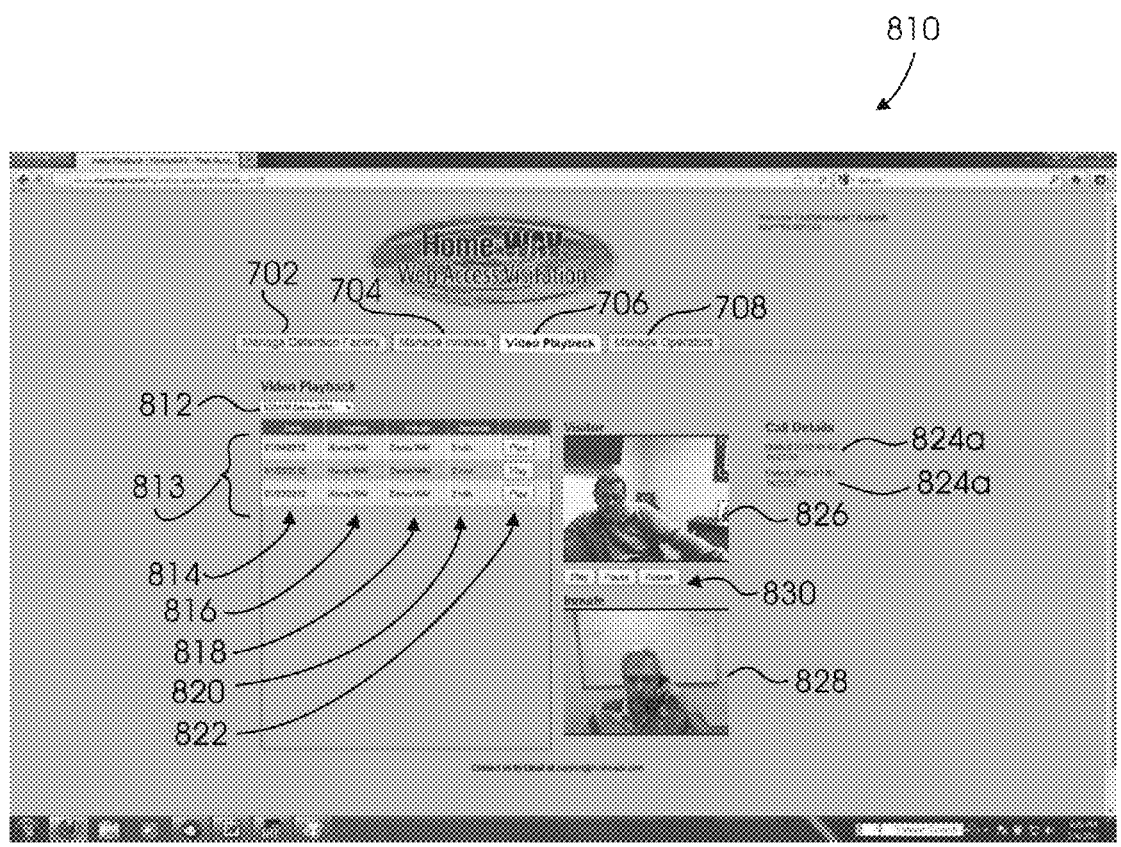
FIG. 6e is a screenshot of a video playback screen of the system for practicing the method of the invention.

Referring now to FIG. 6e there is shown a screenshot of the "Video Display" screen 812. The name and PIN 812 of the selected inmate for whom recorded video is to be viewed is displayed. A matrix of calls 813 with the most recent call at the top of the list is displayed. The columns of the call matrix 813 includes: Date 814, Visitor 816, Inmate 818, and Duration 820. A fifth column includes either a "Play" button 822 or status information if recorded data for the call is not available.

Selecting "Play" button 822 associated with a desired call initiates playback of the selected audio/video file.

A Call Details area, not specifically identified, contains date and start time 824a and date and end time 824b of the selected call.

A Visitor video display area 826 and an Inmate video display area 828 display respective visitor and inmate recorded video.

Controls 830 are used to control playback of the recorded video.

As with previous screens, the operator may return to "Manage Operators" screen 700 by selecting button 708. Other actions "Manage Detention Facility", "Manage Inmates", and "Video Playback" may be selected using buttons 702, 704, and 706, respectively.

If "Manage Operators" button 708 is selected from any screen, the operator is transported to "Manage Operators" screen 840.

Figure 7A:
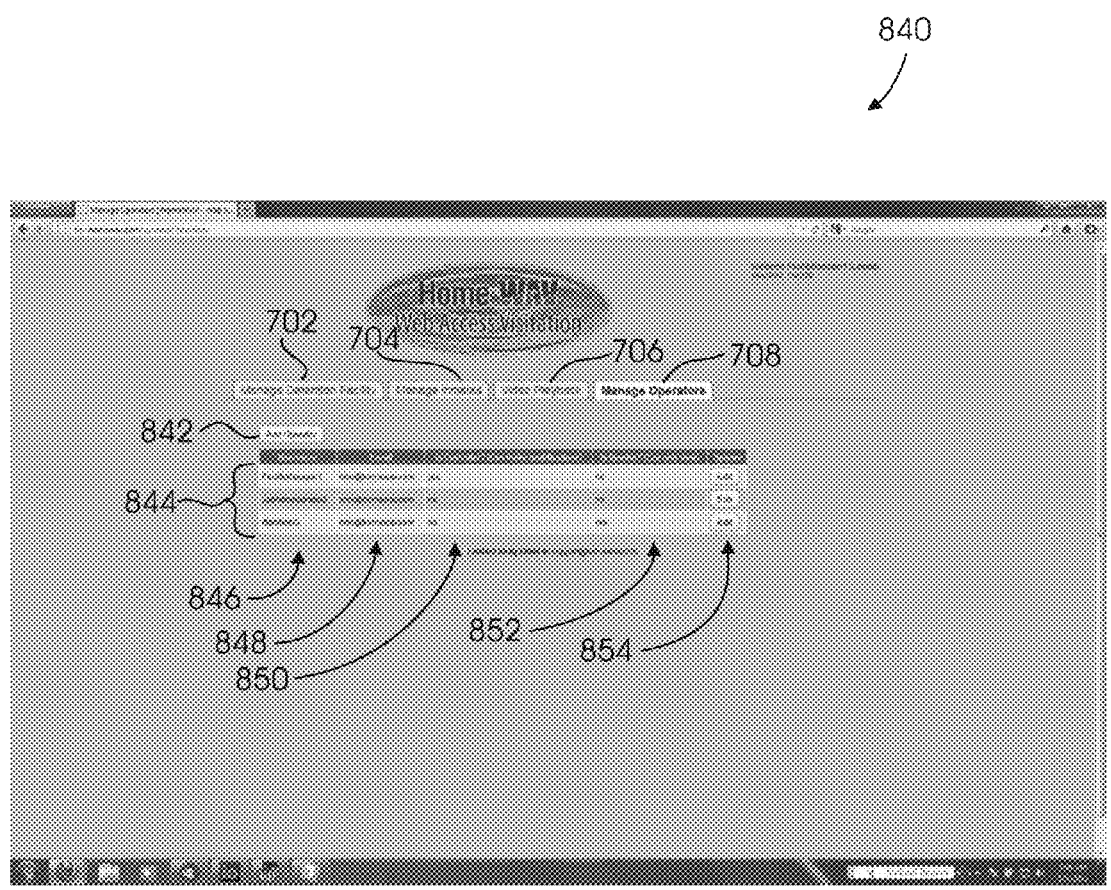
FIG. 7a is a screenshot of the manage operators screen of the system for practicing the method of the invention.

Referring now also to FIG. 7a there is shown a screenshot of the manage operators screen 840. An "Add Operator" button 842 transfers the operator to "Add Operator" screen 860 described in detail hereinbelow.

A list of operators 844 is displayed. Information displayed in operator list 844 includes: Username 846, E-Mail 848, Is Controller? (can make modifications) 850, Is monitor? (can only view) 852, and Options 854. An "Edit" button associated with each Username 846 is located in Options column 854.

Selecting "Edit" (column 854) associated with an operator Username transfers the operator to "Edit an Operator" screen 860.

Figure 7B:
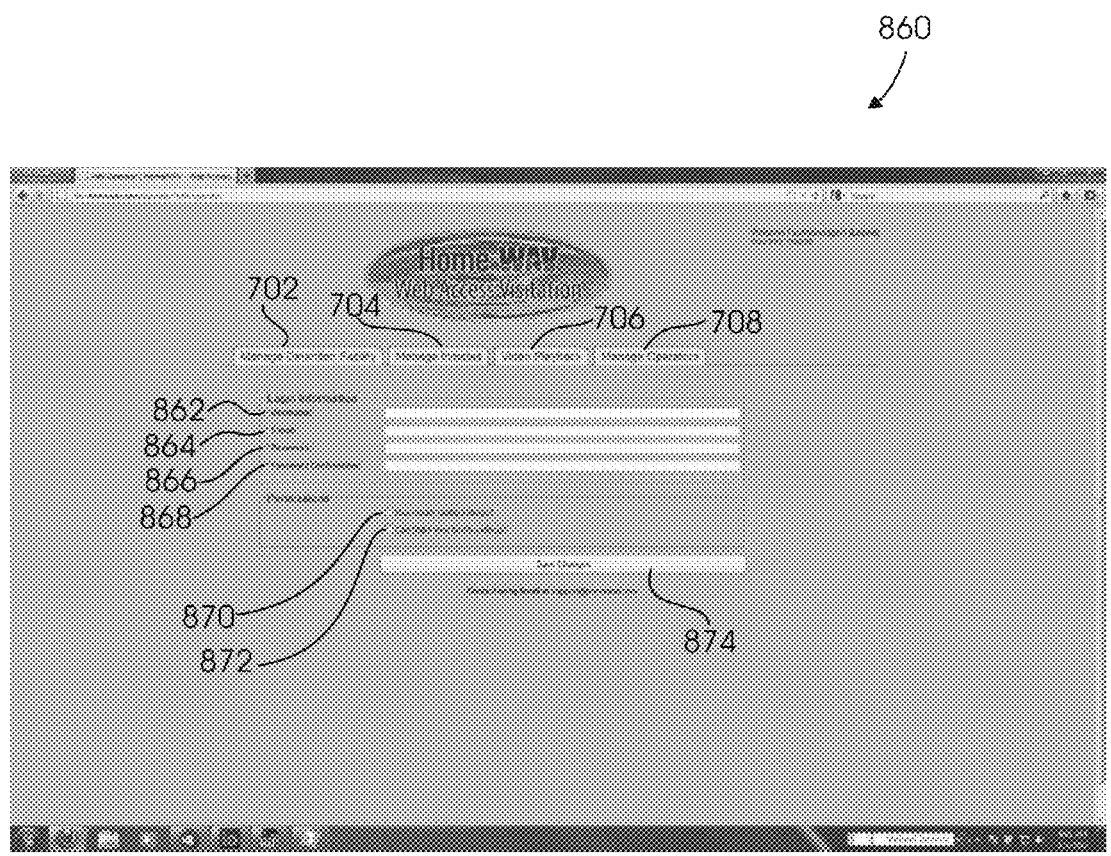
FIG. 7b is a screenshot of the add an operator screen of the system for practicing the method of the invention.
Figure 7C:
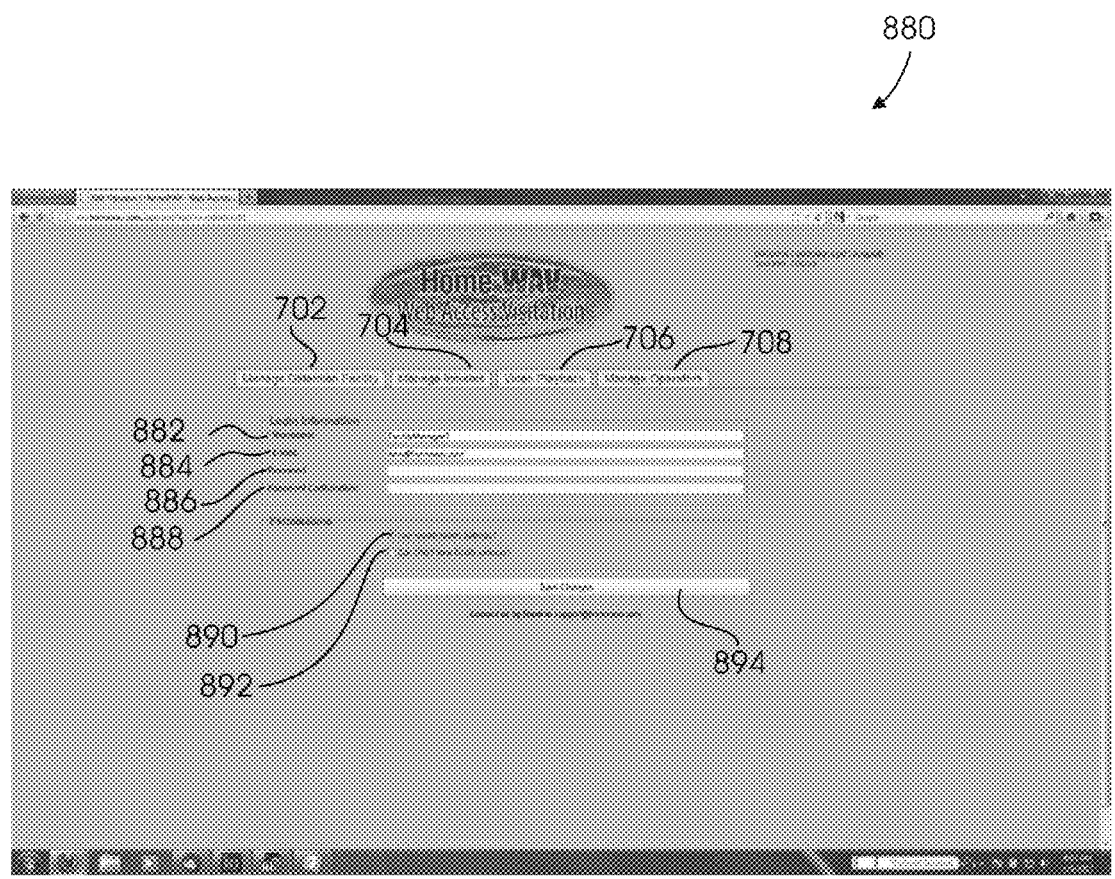
FIG. 7c is a screenshot of the "Edit an Operator" screen of the system for practicing the method of the invention.

Referring now also to FIG. 7c there is shown a screenshot of "Edit an Operator" screen 860. The Username 882, the E-Mail address 884, the Password 886, and the Password Confirmation fields are displayed.

A pair of check boxes 890, 892, respectively, allow the operator associated with the selected Username 882 to "Modify Facility Settings" 890, and "Only Display Settings, 892.

When all information on screen 880 is correct, the operator selects the "Save Changes" button 894 to save the record with all changes.

If "Add Operator" button 842 has been selected, the operator is transferred to "Add Operator" screen 860.

Referring now also to FIG. 7b, there is shown a screenshot of the "Add an Operator" screen 860. As with previous screens, the operator may return to "Manage Detention Facility" screen 700 by selecting button 702. Other actions "Manage Inmates, "Video Playback", and "Manage Operators" may be selected using buttons 704, 706, and 708, respectively.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A web-based audio/video visitation system for prisons providing only inmate initiated web-based audio and video communications on a prepaid per-minute basis, comprising:
 a webserver having a processor and non-transitory memory with computer executable instructions to host the web-based audio/video visitation web service over an Internet, the webserver having an administrative interface that hosts an administrative user web-interface on an administrative system and being associated with a prison in which a particular inmate is located, an inmate-visitor interface that hosts an inmate-visitor user web-interface on a workstation of a inmate-visitor that is a registered inmate-visitor of the particular inmate and that is located remote from a location of the particular inmate, and an inmate interface that hosts an inmate user web-interface on an inmate terminal accessible by the particular inmate and that is enabled to receive inputs from the particular inmate that includes a request for establishing a web-based communication to the workstation of the inmate-visitor;

wherein the inmate interface is configured to interface to the inmate terminal that is disposed in the prison and is operatively connected to and communicative therewith via the Internet, the hosted inmate user web-interface utilizing at the inmate terminal the receiving and providing of audio and video using a speaker, a microphone, a video display and a video camera, associated with the inmate terminal and that is operatively connected via the Internet to the inmate interface using an inmate terminal network interface;

and wherein the inmate-visitor interface of the webserver and the webserver are configured to operatively communicate with the inmate-visitor workstation of the registered inmate-visitor the Internet and to receive a registration of the inmate-visitor for the particular inmate with the registration including an Internet address of the inmate-visitor workstation of the inmate-visitor and a name of the inmate-visitor, to enable the inmate-visitor workstation to provide an inmate-visitor user web-interface providing audio and video communication therewith using a video display, a video camera, a microphone and a speaker of the inmate-visitor workstation by communicating with the inmate-visitor workstation of an inmate-visitor network interface of the inmate-visitor workstation that is operatively connected to the Internet and therefore to the inmate-visitor interface of the webserver;

the webserver configured to operatively communicate over the administrative interface with the administrative system via the Internet for managing the inmate interface, the inmate-visitor interface, and the web-based audio/video communication over the Internet as initiated by the particular inmate using the inmate user web-interface at the inmate terminal;

to receive from the inmate interface an inmate-visitor a selection of a number of non-visit specific pre-paid minutes of communication time between the inmate-visitor and the particular inmate that will be applicable for one or more audio/video communications therebetween;

to receive pre-paid per-minute funds from an Internet based payment service operatively connected to the webserver;

to store in a database information related to both the particular inmate and the inmate-visitor name and Internet identification and address as received by the inmate-visitor workstation and the received non-visit specific per-paid minute funds from the inmate-visitor of the particular inmate;

to provide over the inmate interface a displayed listing of the name of the registered inmate-visitor;

to receive over the inmate interface a selection of the inmate of the displayed listed name of the registered inmate-visitor to which the inmate wishes to make a current web-based communication;

to receive a request from the inmate over the inmate interface to establish web-based communication between the inmate and the selected inmate-visitor;

to verify a current authority of the inmate to have a communication with the selected inmate-visitor;

to verify an availability of non-visit specific pre-paid minute funds associated with the inmate and the selected inmate-visitor;

to establish the inmate initiated web-based audio and video communications between the inmate-visitor interface of the selected inmate-visitor and the inmate interface of the inmate responsive to the received selection and request from the inmate, the established web-based communication forming a visit;

to monitor a duration of the established inmate initiated web-based communication; and to terminate the web-based communication as a function of the monitored duration as compared to the verified availability of non-visit specific pre-paid minute funds.

2. The system of claim 1, wherein at least one of the webserver, the administrative system and the administrative interface is further configured to enable an audio/video recording facility forming part of and operatively connected to the webserver;

to record at least a portion of said web-based audio/video audio communication visit;

to determine prior to said recording if the selected inmate-visitor is exempt from having his/her Internet audio/video visit with the particular inmate recorded; and when it is determined that the selected visitor is exempt from having his/her Internet audio/video visit with the particular inmate recorded, suppressing execution of said recording of the inmate initiated web-based audio/video communication to the selected inmate-visitor.

3. The system of claim 1, wherein the webserver is further configured to store a maximum allowable call time for an web-based audio/video communication between the inmate-visitor and the particular inmate;

to automatically track the monitored duration of web-based audio/video communication visit to provide an accumulated call time between the particular inmate and the selected visitor;

to automatically compare the accumulated call time to the stored allowable maximum call time, and to automatically terminate the web-based audio/video communication visit when the comparing determines that the accumulated call time exceeds the stored allowable maximum call time, wherein at least one user web-interface selected from the group consisting of the inmate user web-interface, the inmate user web-interface and the administrative user web-interface is configured to display the accumulated call time for the web-based audio/video communication.

4. The system of claim 1, wherein the webserver is configured to receive a separate inmate-visitor selection of a number of non-visit specific pre-paid minutes of communication time from two or more registered inmate-visitors for the particular inmate;

to receive pre-paid per-minute funds from the Internet based payment service for each of the separate inmate-visitor selections of the number of non-visit specific prepaid minutes of communication from the two of the two or more registered inmate-visitors for the particular inmate; and to store in the database the received pre-paid per minute funds in an account associate with the particular inmate and each separate inmate-visitor.

5. The system of claim 4, wherein the webserver is configured to process each separate inmate-visitor selection and to receive pre-paid per-minute funds from the Internet based payment service that is an on-line payment system.

6. The system of claim 1 wherein the webserver is configured to receive a registration from two or more inmate-visitors of the particular inmate, each received registration including the Internet identification and address of the registering inmate-visitor workstation and a name of the inmate-visitor, and wherein the inmate interface provides the inmate user web-interface with the displayed listed of the names of the two more inmate-visitors of the particular inmate and wherein the received selection over the inmate interface is a selected one of the displayed name of the displayed listing of two or more inmate-visitors.

7. The system of claim 6 wherein the webserver is configured
to monitor the inmate-visitor interface for each of the registered two or moreinmate-visitors of the particular inmate and to determine a current availability of each inmate-visitor for receiving an inmate initiated web-based communication, and
to provide to the inmate user web-interface of the particular inmate via the inmate interface an availability status indicator as to the determined current availability status of each of the two or more of the registered inmate-visitors for the particular inmate.

8. The system of claim 6 wherein at least one of the web-server, the administrative interface, the administrative system, and the inmate interface is configured to enable the inmate to immediately initiate the web-based communication to the selected registered inmate-visitor where it is determined that the selected registered inmate-visitor is currently available to receive an inmate initiated web-based communication, wherein the webserver establishes the inmate initiated web-based communication to the selected registered inmate-visitor automatically and without administrative review, human review, authorization, enablement, intervention, or oversight, where the determined current available.

9. The system of claim 1 wherein the webserver is configured
to monitor the inmate interface of the particular inmate and determine a current availability of the particular inmate to initiate an inmate initiated web-based communication, and
wherein the webserver and the inmate-visitor interface are configured to provide to the inmate-visitor user web-interface an availability status indicator as to the determined current availability status of the particular inmate.

10. The system of claim 1 wherein the web-server and the administrative system are configured
to receive and store in the database information a maximum allowable call time for a web-based audio/video communication between the registered inmate-visitor and the particular inmate; to monitor a duration of the established inmate initiated web-based communication; and
to terminate the web-based communication as a function of the duration being the stored maximum allowable call time.

11. The system of claim 1 wherein the webserver is configured
to monitor the inmate-visitor interface of the registered inmate-visitor of the particular inmate,
to determined a current availability of the registered inmate-visitor for receiving a web-based communication from the particular inmate; and
to provide to the inmate user web-interface of the particular inmate via the inmate interface an availability status indictor as to the determined current availability status of the registered inmate-visitor for the particular inmate.

12. The system of claim 11 wherein the inmate interface, the inmate user web-interface, and the webserver are each configured to enable the inmate to initiate and transmit a text-message via the inmate-visitor web-interface to a pre-determined user device of the selected registered inmate-visitor of the particular inmate, wherein the transmitted text-message indicates a request of the particular inmate to establish an web-based audio/video communication with a selected registered inmate-visitor, the enablement of the text-message initiation by the inmate user web-interface and the web-server being limited to when the current availability status indictor of the selected inmate-visitor indicates that the selected inmate-visitor is not currently available to receive an web-based audio/video communication from the particular inmate.

13. The system of claim 1 wherein the webserver is configured
to monitor the inmate interface of the particular inmate,
to determined a current availability of the registered inmate for initiating a web-based communication by the particular inmate; and
to provide to the inmate-visitor user web-interface of the inmate-user an availability status indictor as to the determined current availability status of the particular inmate for initiating the web-based communication to the registered inmate-visitor.

14. The system of claim 1 wherein the administrative system is a hosted function of the administrative web-hosted interface of the web-server and wherein the inmate interface is subordinate to the administrative interface and the inmate user web-interface is a web-hosted interface within the administrative web-hosted interface.

15. A web-based audio/video visitation system for prisons providing inmate initiated audio and video communications, comprising:
a webserver having a processor and non-transitory memory with computer executable instructions to host the web-based audio/video visitation web service over an Internet, the webserver having a administrative interface interfacing to an administrative system and hosting an administrative user web-interface and being associated with a prison in which a particular inmate is located, a inmate-visitor interface hosting an inmate-visitor user web-interface interfacing on two or more inmate-visitor workstations of two or more registered inmate-visitors of the particular inmate with each being located remote from a location of the particular inmate and providing an inmate-visitor user web-interface to each registered inmate-visitor, a inmate interface hosting an inmate user web-interface on an inmate terminal accessible by the particular inmate, the inmate interface being enabled to receive an input from the inmate user web-interface as to a selection of the inmate-visitor and a request from the inmate to establish a web-based communication to the workstation of the selected inmate-visitor;
the webserver is further configured with computer executable instructions stored in a non-transitory memory:

to receive the registration of the two or more inmate-visitors for the particular inmate;

to operatively communicate with each of the inmate-visitor workstations via the Internet to host the inmate-visitor user web-interface;

to operatively communicate with the administrative system via the Internet to host the administrative user web-interface and to enable the management of the inmate user web-interface and the inmate-visitor user web-interface and the webserver;

to store in a database information related to both the particular inmate and each of the registered inmate-visitors using the two or more visitor workstations associated with the particular inmate;

to monitor the inmate-visitor interface to determine a current availability for each of the registered inmate-visitors to receive a web-based communication from the particular inmate;

to communicate via the inmate interface to the inmate user web-interface the determined current availability indicator status for each registered inmate-visitor of the particular inmate that indicates;

to receive over the inmate interface from the inmate user web-interface a selection of one of the two or more inmate-visitors to establish in real time an inmate initiated web-based audio/video communication wherein the selected one of the inmate-visitors has a current availability indicator status indicating a current availability of the inmate-visitor to received the inmate initiated web-based audio/video communication; and to establish the inmate initiated web-based audio/video communication to the inmate-visitor workstation of the selected inmate-visitor, the established web-based audio/video communication forming a visit.

16. The system of claim 15 wherein the inmate interface and the webserver are each configured to enable the inmate to prepare and transmit a text-message to a selected one of the registered inmate-visitors for the particular inmate, the text-message indicating a request of the inmate to establish an web-based audio/video communication with a selected registered inmate-visitor, the enablement of the inmate transmitting of the text-message being limited to when the current call receipt status of the selected inmate-visitor indicates that the selected inmate-visitor is not currently available to receive an web-based audio/video communication from the particular inmate.

17. The system of claim 15 wherein the received registration of each of the two more inmate-visitors includes a name and an Internet address of inmate-visitor and wherein the inmate interface of the webserver is configured to provide over the inmate interface a displayed listing of the name of the registered inmate-visitor, wherein the communicated determined availability indicator states of each registered inmate is displayed proximate to the displayed listed name of each registered inmate-visitor, wherein the received inmate selection of the one of the two more inmate-visitors is a selection by the inmate using the inmate user web-interface of one of the displayed listed names.

18. The system of claim 15 wherein the webserver is configured to monitor the inmate interface of the particular inmate, to determined a current availability of the registered inmate for initiating a web-based communication by the particular inmate; and to provide to each of the inmate-visitor user web-interfaces of the inmate-users associated with the particular inmate an availability status indictor as to the determined current availability status of the particular inmate for initiating the web-based communication to registered inmate-visitors.

19. The system of claim 15 wherein the webserver is further configured to receive prepayment of pre-paid minutes for two or more communications between each of the two or more inmate-visitor workstations for the registered inmate-visitors for the particular inmate;

to store in a database information related to both the particular inmate and each of the registered inmate-visitors using the two or more visitor workstations associated with the particular inmate including the received prepayment for a communication from a particular one of the two or more inmate-visitors associated with the particular inmate;

to verify an availability of prepayment for the communication between the particular inmate and the selected inmate-visitor;

to monitor the duration of the established inmate initiated web-based audio/video communication; and to limit the duration of the established inmate initiated web-based audio/video communication as a function of the prepayment for the communication.

20. The system of claim 15 wherein the webserver is configured to enable an automatic recording of the web-based audio/video communication between the inmate-visitor and the inmate;

to determine if the selected visitor is exempt from having his/her Internet audio/video communication with the particular inmate recorded; and to suppress the automatic recording of the inmate initiated communication to the selected visitor where it is determined that the selected visitor is exempt from having the inmate initiated communication with the particular inmate recorded.

21. The system of claim 15 wherein the webserver is configured to store a maximum allowable time for an web-based audio/video communication between the inmate-visitor and the particular inmate, to monitor the duration of the established inmate initiated web-based audio/video communication;

to automatically compare the monitored duration to the stored allowable maximum call time; and to automatically terminate the Internet web-based communication when the comparing determines that the accumulated call time exceeds the stored allowable maximum call time.

* * * * *